(12) United States Patent
Falek et al.

(10) Patent No.: US 11,703,613 B2
(45) Date of Patent: Jul. 18, 2023

(54) MULTIPLE SCATTERING SYNTHESIS METHOD

(71) Applicant: Spectralics Ltd., Tel Aviv (IL)

(72) Inventors: Eran Falek, Netanya (IL); Yuval Kashter, Tel Aviv (IL); Ran Abraham Bar-Yosef, Tel-Aviv (IL)

(73) Assignee: Spectralics Ltd., Tel Aviv (IL)

( * ) Notice: Subject to any disclaimer, the term of this patent is extended or adjusted under 35 U.S.C. 154(b) by 0 days.

(21) Appl. No.: 17/483,835

(22) Filed: Sep. 24, 2021

(65) Prior Publication Data

US 2022/0260753 A1 Aug. 18, 2022

Related U.S. Application Data

(63) Continuation of application No. PCT/IL2020/050351, filed on Mar. 24, 2020.

(60) Provisional application No. 62/822,914, filed on Mar. 24, 2019.

(51) Int. Cl.
*G02B 1/00* (2006.01)
*G01M 11/02* (2006.01)
*G02B 5/20* (2006.01)
*G02B 5/28* (2006.01)

(52) U.S. Cl.
CPC ......... *G02B 1/002* (2013.01); *G01M 11/0228* (2013.01); *G02B 5/20* (2013.01)

(58) Field of Classification Search
CPC ....... G02B 1/002; G02B 5/20; G01M 11/0228
See application file for complete search history.

(56) References Cited

U.S. PATENT DOCUMENTS

| 2005/0036738 A1 | 2/2005 | Zhou et al. |
| 2005/0141093 A1 | 6/2005 | Weber |
| 2006/0014087 A1 | 1/2006 | Wittenberg et al. |
| 2007/0285601 A1 | 12/2007 | Hendrix et al. |

(Continued)

FOREIGN PATENT DOCUMENTS

GB 2396436 A 6/2004

OTHER PUBLICATIONS

Extended European Search Report for EP Application EP20779620.2, dated Aug. 17, 2022.

(Continued)

*Primary Examiner* — Catherine S Branch
(74) *Attorney, Agent, or Firm* — Pearl Cohen Zedek Latzer Baratz LLP

(57) ABSTRACT

A method of synthesizing an effective refractive index metamaterial, the method may include the steps of: a) analysing an effective index material by directing an electromagnetic plane-wave towards a surface of the metamaterial and calculating the polarization currents distribution field in the metamaterial, wherein the effective refractive index metamaterial is comprised of a plurality of layers of at least a first material having a first refractive index and at least a second material having a second refractive index; b) filtering and sampling the polarization currents distribution field according to the layers, wherein the layers comprise pre-determined parameters requirements, the parameters including at least one of: refractive indexes of the first material and the second material, effective refractive index of the layer and thickness of the layer; and c) determining a layer arrangement and thickness for the first and second materials comprising the plurality of layers.

10 Claims, 20 Drawing Sheets

(56) References Cited

U.S. PATENT DOCUMENTS

2011/0134515 A1    6/2011  Banerjee et al.
2011/0279901 A1   11/2011  Watanabe
2013/0016030 A1    1/2013  Liu et al.
2014/0293467 A1   10/2014  Palikaras et al.
2016/0252652 A1    9/2016  Shen et al.

OTHER PUBLICATIONS

Bovard B G, "Rugate Filter Design: The Modified Fourier Transform Technique", Applied Optics, Optical Society of America, Washington DC, US, vol. 29, No. 1, Jan. 1, 1990, pp. 24-30.
Southwell W H et al., "Rugate Filter Sidelobe Suppression Using Quintic and Rugated Quintic Matching Layers", Applied Optics, Optical Society of America, Washington DC, US, vol. 28, No. 14, Jul. 15, 1989, pp. 2949-2951.
Tikhonravov A V et al., "New Optimization Algorithm for the Synthesis of Rugate Optical Coatings", Applied Optics, Optical Society of America, Washington DC, US, vol. 45, No. 7, Mar. 1, 2006, pp. 1515-1524.
Perva K V et al., "Band Filters: Two-Material Technology Versus Rugate", Applied Optics, Optical Society of America, Washington DC, US, vol. 46, No. 8, Mar. 10, 2007, pp. 1190-1193.
International Search Report for PCT Application No. PCT/IL2020/050351, dated Aug. 10, 2020.

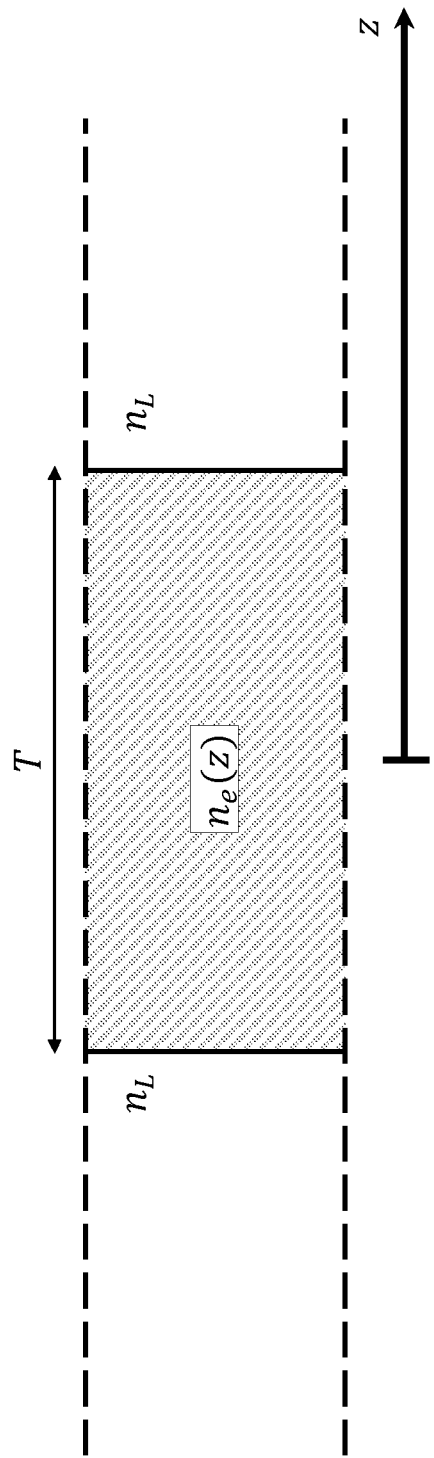
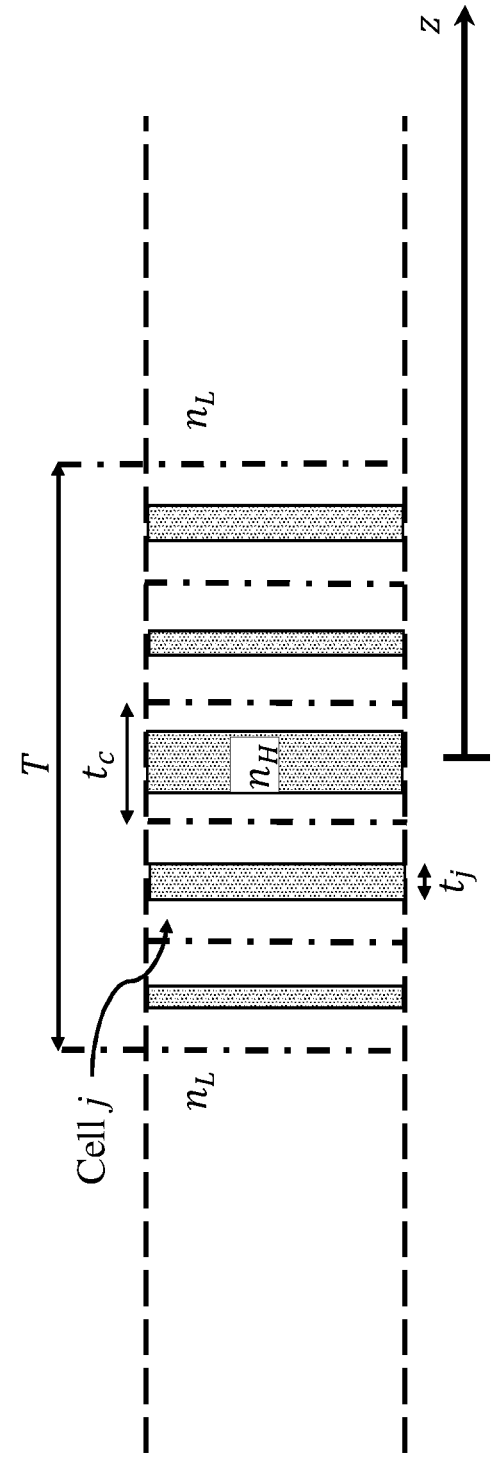
Figure 1A
Figure 1B

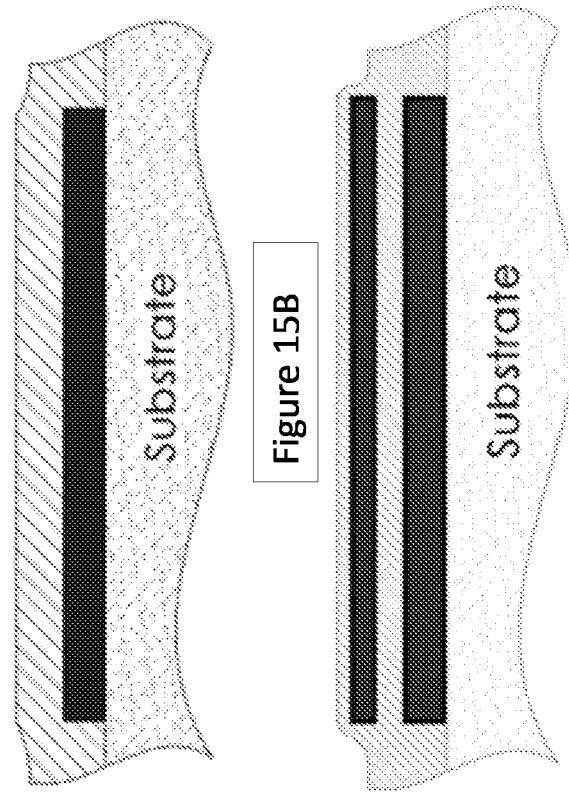
Figure 15B
Figure 15D
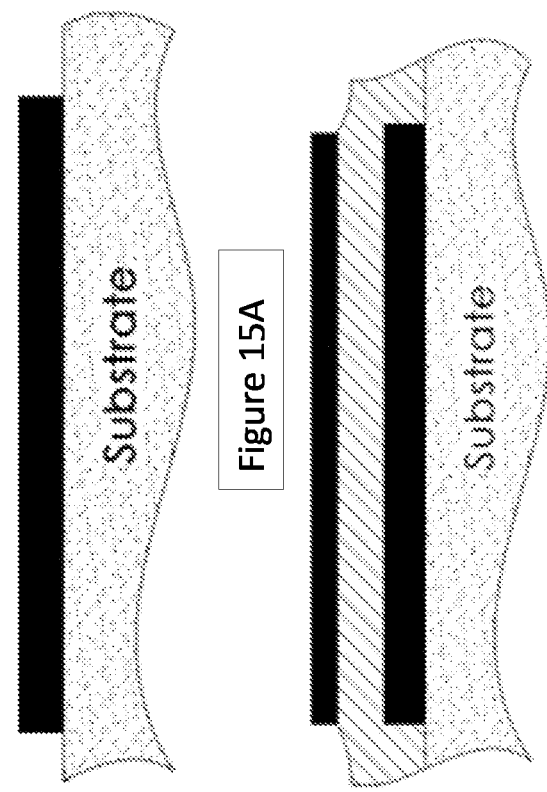
Figure 15A
Figure 15C

MULTIPLE SCATTERING SYNTHESIS METHOD

CROSS REFERENCE TO RELATED APPLICATIONS

This application is a continuation of PCT Application no. PCT/IL2020/050351 filed on Mar. 24, 2020, claiming priority from U.S. Provisional Patent Application No. 62/822,914 filed on Mar. 24, 2019, both incorporated herein by reference in their entireties.

FIELD OF THE INVENTION

The present invention relates generally to multi-layered thin optical filters configured to synthesize the optical properties of a given medium of given refractive indexes.

BACKGROUND OF THE INVENTION

Optical filters are some of the most commonly used elements in a variety of optical applications. These can be found in the form of a thin coating on many different optical components (such as lenses, mirrors, beam splitters etc.). These filters enable the manipulation of the radiation intensity, in terms of reflection or transmission efficiency, as a function of the wavelength (from the ultraviolet to the long wave infrared). One of the most commonly used types of optical coatings is an anti-reflective (AR) coating: of which a V-coating, a special case of AR coating, enhances the transmissivity of the transmitted light, of a specific or narrow band wavelength, through an optical system. In addition to the V-coating, AR coatings can be found in more sophisticated forms, for example, AR coatings that transmit all of the visible range in a uniform manner High Pass Filters (HPFs) and Low Pass Filters (LPFs) are also used in many optical applications, especially in laser systems. Another important type is the Notch Filter (NF), also known as the Band-Pass Filter (BPF). NFs are commonly used in optical systems that require a significant reflection of a specific spectral bandwidth with minimal effect on the rest of the spectral range. Therefore, one of their most natural applications is in augmented reality, and particularly in Head Up Display (HUD) systems. NFs are significantly more complex than the rest of the aforementioned filters since they require the implementation of fast-varying reflection functions (contrary to a V-coating, for example, which is based on a relatively smooth reflection function). In fact, as the required bandwidth gets narrower—which implies a faster varying function—the filter becomes more complicated, thick and expensive.

The multi-layered band-gap filter, which is based on the principle of small reflections (also denoted as the interference filter), allows additional degrees of freedom in the filter design. Therefore, this structure provides the ability to obtain a superior performance (e.g., narrow band NF, controlled side lobes and multiple reflection bands), and to optimize certain features but at the expense of others. These multiple layered structures, however, require more complicated manufacturing processes.

The most basic band-gap filter designs are based on uniform alternating layers of material (i.e., a periodic structure that is based on uniform thickness and refractive indexes) that can manipulate the spectral response of the filter. According to this method, in order to achieve a relatively fast varying reflection/transmission profile, a relatively thick filter composed of a large number of layers is required. In addition, significant side lobes may be introduced. By allowing the variation of the thicknesses and materials used, it is possible to minimize the coating's total thickness and to suppress (or at least to control) the effect of side lobes. With this being said, fabrication of a coating involving many different arbitrary materials is particularly challenging. In order to overcome the need for many arbitrary materials in the design, the synthesis of equivalent materials inside the multi-layered structure using the metamaterial concept may be used. A metamaterial is a sub-wavelength complex structure, which emulates some physical characteristics of an effective material. The composite material is comprised of several unit-cells in which there is a geometric structure. The material and geometrical properties serve as degrees of freedom to achieve the required effective properties. Here, a unit-cell consists of a thin layer with a pre-determined permittivity, and its thickness may be controlled. By doing so, arbitrary materials may be emulated whilst using only a few different materials, even just two different materials for the fabrication process.

The ambition to achieve optimal optical performance in band-gap optical filters, such as narrow-band NFs which provide significant reflection of a specific colour, often requires a relatively large number of alternating layers. Unfortunately, the fabrication of such structures, which can be done using various deposition techniques, such as atomic layer deposition (ALD), sputtering, electron-beam evaporation and so on, may be expensive and time consuming In addition, a large number of alternating layers would result in an overall thick coating, which may become visible due to the abrupt transition regions at the edges. For example, the edge of a relatively thick coating (5-8 µm) might be revealed due to the existence of scattered light from the edge. This phenomenon may result in visual artefacts.

The above-mentioned alternating layers, on which basis the present invention is made, are made of at least two different materials: the first with a relatively low refractive index, denoted by $n_L$, and the other with a relatively high refractive index, denoted by $n_H$. In contrast to conventional techniques, the $n_H$ layers are replaced by layers of an arbitrary effective refractive index. This refractive index can also vary within the layer if necessary. By doing so, additional degrees of freedom are provided, allowing the optimization of the filter's performance whilst maintaining a minimal overall thickness. As a result, the new layered structure is no longer periodic, but based on non-uniform (i.e. different thickness of material in the direction orthogonal to the surface of the filter) optical paths in each layer. The non-uniform layers are realized by a one-dimensional metamaterial structure. The method of designing this artificial material is called the Multiple Scattering Synthesis Method (MSSM).

In the case where deposition is used, there is a major advantage to the new structure in terms of deposition rates. In most standard deposition processes, the deposition rate of lower refractive index materials, such as silicon dioxide (SiO2), is significantly faster than for higher index materials (e.g., tantalum oxide Ta2O5). Owing to the use of the MSSM technique, the silicon dioxide content of the filter can be more than 80%, thus the overall deposition rate is much faster than the commonly used techniques of designing alternating layer structures.

The invention provides two filter design methods for an optical filter. One design method uses the ability to emulate a single layer of varying arbitrary refractive index using layers of at least two a priori given materials with refractive indices $n_L$ and $n_H$. This is done by calculating the distribution of the polarization currents in the original layer, processing and sampling said currents, and producing said currents using different thicknesses of $n_H$ materials. The second design is to obtain the required or desired reflection pattern using a modified alternating structure. To this end, the two designs considered are: a) the direct design; and b) the Chebyshev method. The latter optimizes the total thickness of the filter for the desired bandwidth by allowing controllable side lobes to the pattern.

SUMMARY OF THE PRESENT INVENTION

According to a first aspect of embodiments of the invention there is provided a method of synthesizing an effective refractive index metamaterial, said method comprising the steps of: analysing an effective index material by directing an electromagnetic plane-wave towards a surface of said metamaterial and calculating the polarization currents distribution field in said metamaterial, wherein said effective refractive index metamaterial is comprised of a plurality of layers of at least a first material having a first refractive index and at least a second material having a second refractive index; filtering and sampling said polarization currents distribution field according to said layers, wherein said layers comprise pre-determined parameters requirements, said parameters including at least one of: refractive indexes of said first material and said second material, effective refractive index of said layer and thickness of said layer; and determining a layer arrangement and thickness for said first and second materials comprising said plurality of layers, such that said polarization currents distribution field in said metamaterial imitates the current distribution field generated by surface currents corresponding to said sampled polarization currents distribution field.

According to some embodiments of the invention the first step of the above method comprises: emulating an effective refractive index layer with a homogeneous refractive index by solving a resulting relationship using an analytical method.

According to some embodiments of the invention the first step of the above method comprises: emulating an effective layer with a varying refractive index by solving a resulting relationship using a numerical method.

According to some embodiments of the invention the second step of the above method comprises: calculating the reflected field as a result of the polarization current distribution field; calculating the scattered field as a result of said surface currents; and convolving along the structural cross-section of the effective refractive index layer to obtain the total reflected field.

According to some embodiments of the invention the third step of the above method comprises: determining a layer thickness of each said layer which yields the same reflected surface current field as that produced by said sampled surface currents field.

According to some embodiments of the invention the effective refractive index layer comprises a plurality of unit-cells, wherein said unit-cell comprises at least a first material and a second material, said first material being of a different refractive index than said second material.

According to some embodiments of the invention the unit-cell is embedded in a third material, wherein said third material has the same refractive index as said first material. or said second material.

According to some embodiments of the invention the unit-cell is embedded in a third material, wherein said third material has the same refractive index as second material.

According to some embodiments of the invention the unit-cell comprises a layer of said first material sandwiched between two layers of said second material and wherein each layer of said first material and said second material are of a pre-determined thickness in a direction orthogonal to a surface of said metamaterial.

According to some embodiments of the invention the first material is of a low refractive index and said second material is of a high refractive index.

According to a further aspect of the invention there is provided an effective refractive index metamaterial comprising of a plurality of unit-cells, wherein said unit-cell comprises at least a first material and a second material, said first material being of a different refractive index than said second material.

According to some embodiments of the invention each of said first material and said second material are of a predetermined thickness in a direction orthogonal to a surface of said metamaterial.

According to some embodiments of the invention the first material is of a low refractive index and said second material is of a high refractive index.

According to some embodiments of the invention the unit-cell is embedded in a third material, wherein said third material is of the same refractive index as said first material.

According to some embodiments of the invention the unit-cell is embedded in a third material, wherein said third material is of the same refractive index as said second material.

According to some embodiments of the invention, the unit-cell is embedded in a third material, wherein said third material is of a different refractive index to said first material and said second material.

According to a further aspect of the invention there is provided an optical filter comprising layers of an effective refractive index metamaterial, wherein said effective refractive index metamaterial comprises a plurality of unit-cells, wherein said unit-cell comprises at least a first material and a second material, said first material being of a different refractive index than said second material.

According to some embodiments of the invention, each of said first material and said second material being of a predetermined thickness in a direction orthogonal to a surface of said optical filter.

According to some embodiments of the invention, the first material is of a low refractive index and said second material is of a high refractive index.

According to some embodiments of the invention the unit-cell is embedded in a third material, wherein said third material is of the same refractive index as said first material.

According to some embodiments of the invention, the unit-cell is embedded in a third material, wherein said third material is of the same refractive index as said second material.

According to some embodiments of the invention, the unit-cell is embedded in a third material, wherein said third material is of a different refractive index to said first material and said second material.

According to some embodiments of the invention, a step size of the layers is eliminated by using a mask in the deposition of the material of the higher refractive index.

According to some embodiments of the invention, a step size of the layers is eliminated by using a mask in the deposition of the material of the lower refractive index.

BRIEF DESCRIPTION OF THE DRAWINGS

FIG. 1(a) is a schematic diagram depicting a thin layer of plane-stratified inhomogeneous material with refractive index n(z) embedded in a homogeneous host material of refractive index $n_L$, according to some embodiments of the invention;

FIG. 1(b) is a schematic diagram depicting the material of FIG. 1(a) being emulated by M unit-cells of constant thickness $t_c$, according to some embodiments of the invention At the center of each unit-cell, a thin layer with thickness $t_j$ is located, where j is an index number for referencing the unit-cells. The layers are made of homogenous material having refractive index $n_H$, according to some embodiments of the invention;

FIG. 4(a) shows specifically a plot of the thickness of the thin $n_H$ layers for M=5 unit-cells. FIG. 4(b) shows specifically a plot of the reflection coefficient R as a function of wavelength for M=5, 8 and 12 unit-cells. The blue line is R for the bulk material, and the red, yellow and purple lines are for 5, 8 and 12 unit-cells, respectively. FIG. 4(c) shows specifically the reflection coefficient as a function of the wavelength for M=4 when the edge unit-cells are omitted;

FIG. 5(a) shows specifically a plot of the thickness of the $n_H$ layers. FIG. 5(b) shows a plot of the reflection coefficient R as a function of wavelength, wherein the blue line is R for the bulk material, and the red is for the metamaterial;

FIG. 14(a) shows specifically the Chebyshev polynomial with N=9, $\eta_{eff}$=0.6, and $\eta_{thr}$=0.1 (blue line). The original polynomial consisting of five spectral elements is represented by the red line (curve with the higher peaks (lobes) at either end of the graph, and slightly lower central peak). The fixed coefficients polynomial is represented in black. FIG. 14(b) shows specifically the sine Fourier harmonics of the Chebyshev polynomial. FIG. 14(c) shows specifically a comparison between the resulting filter with a total thickness of 2 μm using the direct method (dashed blue line) against one using the Chebyshev method (solid black line). The FWHM for the Chebyshev based filter is 39 nm, compared to 43 nm for the direct method;

FIGS. 15A-15D include a series of diagrams illustrating the deposition process, according to some embodiments of the invention. FIG. 15A depicts the deposition of a high index layer, shown in black, using a mask. FIG. 15B depicts the deposition of the low index layer, represented by diagonal lines, without the mask. FIGS. 15C & 15D depict repetition of the previous steps. Note that the final step size is the total thickness of the high index layers only.

DETAILED DESCRIPTION OF THE INVENTION

Figure 2A:
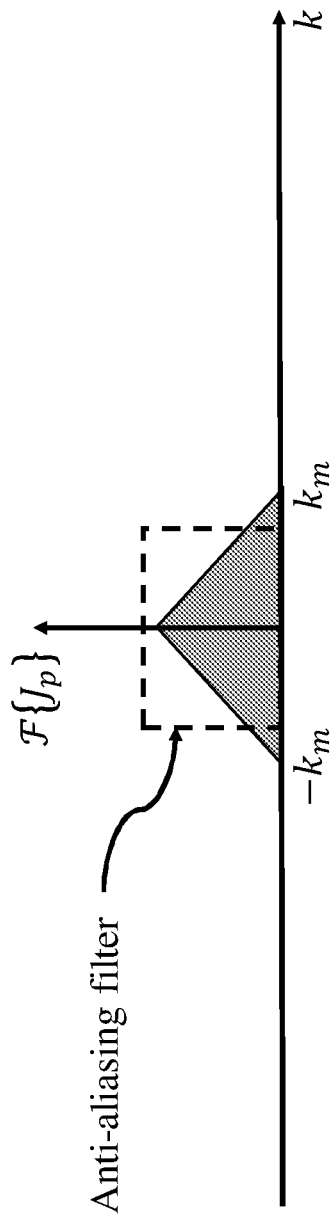
FIG. 2(a) is an illustrative drawing of the Fourier transform of the polarization current distribution, according to some embodiments of the invention. The region $k \in [-k_m, k_m]$ is the support of the spectrum, assuming a band-limited $J_p$. The dashed line is the optimal anti-aliasing filter required in order to avoid aliasing effects.

With specific reference now to the drawings in detail, it is stressed that the particulars shown are for the purpose of example and solely for describing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

The following term definitions are provided to aid in construal and interpretation of the invention.

The term "notch filter" refers generally to an optical filter, possibly a narrowband filter, that has been configured to selectively reflect and/or absorb a portion of the electromagnetic spectrum (i.e., a spectral bandwidth around a specific wavelength) while transmitting all other wavelengths without, or with minimal/infinitesimal, modulation and/or distortion. It is noted that the use of any partially reflective coating can replace a "notch filter" in any embodiment of the present invention disclosed herein.

The term "beam-splitter" refers generally to an optical device configured to split an incident light beam into two or more light beams having identical or differing radiation power. The terms "combiner" or "optical combiner" refer generally to an optical device configured to merge two or more light beams into a single, possibly unified, light beam. In the present context, a combiner may be employed to merge a virtual image, possibly originating from a data overlay device, with a real-world image (i.e., light originating from a scene/environment) such that virtual data is perceived (e.g., by a user) to be aligned, possibly conformally, with features within the real-world.

The term "active area" refers generally to the portion and/or fraction of an item/article which fulfils an optical function when utilized. In the present context, an active area may refer to the portion of a layer in a MLTC which has been modified (e.g., as a result of a notch filter coating) to perform, alone or in combination with other layers, an optical function (e.g., polarization, reflection, modulation, or the like). An active area is typically formed as a continuous undistributed shape, for example in the form of a circular or elliptical ring, and may align with other active areas in other layers to collectively form a composite aperture/interface.

The term "effective aperture" refers generally to the total area/sum of areas through which electromagnetic radiation (e.g., light) may travel. In the present context, the effective aperture is created by the composite of, for example, circular/elliptical sub apertures that are arranged in the form of a multilayered structure. The size of the effective aperture and the focal length of an optical system may collectively dictate the cone angle of rays focused in the image plane of that optical system (also known as "Numerical Aperture" or NA of the system).

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The present invention is a method for synthesis of an artificial material with an effective refractive index ne. The method deals with one dimensional (i.e. thin layer) metamaterials, i.e., a plane-stratified medium. For this reason, the method is suitable for emulating various materials for multilayer based coating processes, including ones with varying refractive index, using thin layers with a pre-defined higher refractive index $n_H$. The layers are arranged within a host material of lower refractive index $n_L$. The present description is by way of example only and more than two materials may be used for the construction of the optical filter.

Consider a material with refractive index ne embedded in a host material with a refractive index $n_L$ as shown in FIG. 1(a). The material is divided into M equal unit-cells with length $t_c$. In each cell is placed a thin layer of material with refractive index $n_H$ and thickness $t_j$, where j∈[1, M] is the unit-cell's indexing reference, as shown in FIG. 1(b). The aim is to determine the set $t_j$ such that the newly composed layered structure imitates an ideal effective refractive index material (i.e. for a notch filter the ideal effective refractive index is 1.67). In the case of reflection-based filters, the reflected fields are required to be identical. To this end, three design steps may be performed as follows:

1. The original effective material is analyzed. An incident electromagnetic plane-wave with amplitude $E_i$ meets the surface (at normal incidence), and the polarization current distribution $J_p(z)$ is calculated.

2. The polarization current distribution $J_p(z)$ is filtered and sampled according to the unit-cell size requirements, to obtain $J_{pj}$, where j∈[1, M].

3. The layer thicknesses $t_j$ are determined in order to obtain the same reflected field as would be generated by surface currents corresponding to the sampled currents $J_{pj}$.

The first step described above for the case of emulating a layer with a homogeneous refractive index can be solved analytically (similarly to the solution shown in Eqs. (3)-(4)) below. However, in cases where it is not possible, e.g., for a varying refractive index, one can use numerical methods. A method which may be used is the Method of Moments (MoM), since the solution is given directly in terms of polarization currents; however, other methods (e.g. the Finite Element Method (FEM)) can be used as well.

In order to explain the second step, it is instructional to first calculate the reflected field as a result of the polarization current distribution. The scattered field as a result of a surface current of amplitude $J_s$ is given by $$E_{ss}(z) = \frac{J_s \eta}{2} e^{\pm jk_L z}, \quad (1)$$

where $k_L = 2\pi n_L/\lambda$ is the wave number, $\lambda$ is the wavelength in vacuum and $\eta = \sqrt{\mu_0/\epsilon} = 120\pi/n_L$ is the impedance. The plus and minus sign should be used for $z<0$ or $z>0$, respectively. Eq. (1) has the form of a Green's function and can be convolved all along the structure's cross-section to obtain the total reflected field as follows:

$$E_r(z) = \frac{1}{2} \int_{-T/2}^{T/2} J_p(z') e^{jk_L(z-z')} dz' \quad (2)$$

$$= \frac{e^{jk_L z}}{2} \int_{-T/2}^{T/2} J_p(z') e^{jk_L z'} dz',$$

where $z<-T/2$. The integral in Eq. (2) is a Fourier transform of the polarization current distribution sampled at the wave number $k=k_L$. Therefore, Eq. (2) implies that the information on the reflected field is located at a single point of the polarization current spectrum.

Figure 2B:
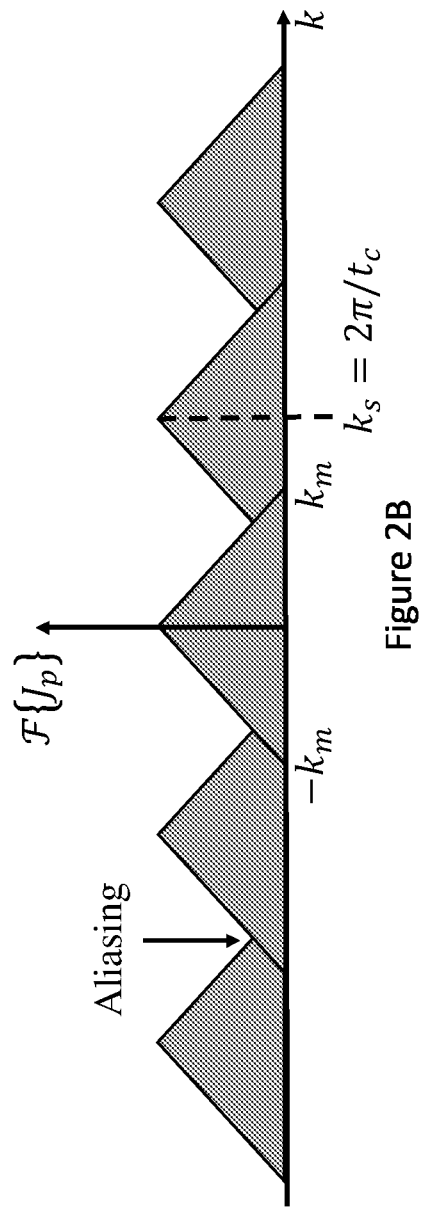
FIG. 2(b) is an illustrative drawing of the Fourier transform of the polarization currents distribution post-sampling, with a sampling period $t_c$, according to some embodiments of the present invention. The aliasing effect is visible as overlapping of the replicated spectra. Note that by applying the anti-aliasing filter as shown in FIG. 2(a), the aliasing effect will be eliminated.

Sampling the polarization current distribution in space creates replicas of the spectrum for each $k=mk_s$, where m is an integer, and $k_s=2\rho/tc$ (see FIG. 2(b)). Brute-force sampling, therefore, might result in aliasing, which is defined as the overlap of a replicated spectral region with the original spectrum. However, since only one spectral element is important for the calculation of the scattered field, it is possible to use an anti-aliasing filter on the spectrum, i.e., altering the polarization current distribution such that the overlaps in the spectral range are eliminated. An illustrative drawing of the process is shown in FIG. 2.

In order to perform the required processing, the Fourier transform of the calculated $J_p(z)$ must be determined, following which a filter is applied to the spectrum. The requirements on the filter are that it equals 1 for $k\in[-k_L,k_L]$, and vanishes for $|k|>k_s-k_L$. The spectral region where $k_L<k<k_s-k_L$ or $-k_s+k_L>k>-k_L$ is a transition band which can be chosen in various ways (Gaussian, raised cosine, etc.).

After applying the filter on the spectrum of $J_p$, one can calculate the inverse Fourier transform to obtain the processed polarization current distribution $J_{pp}(z)$. Due to the convolution between the filter and $J_p$, the processed currents distribution $J_{pp}$ is wider (has a larger support) than the original. The processed current distribution is then sampled with a sampling period $t_c$ to obtain $J_{pj}$.

Figure 3:
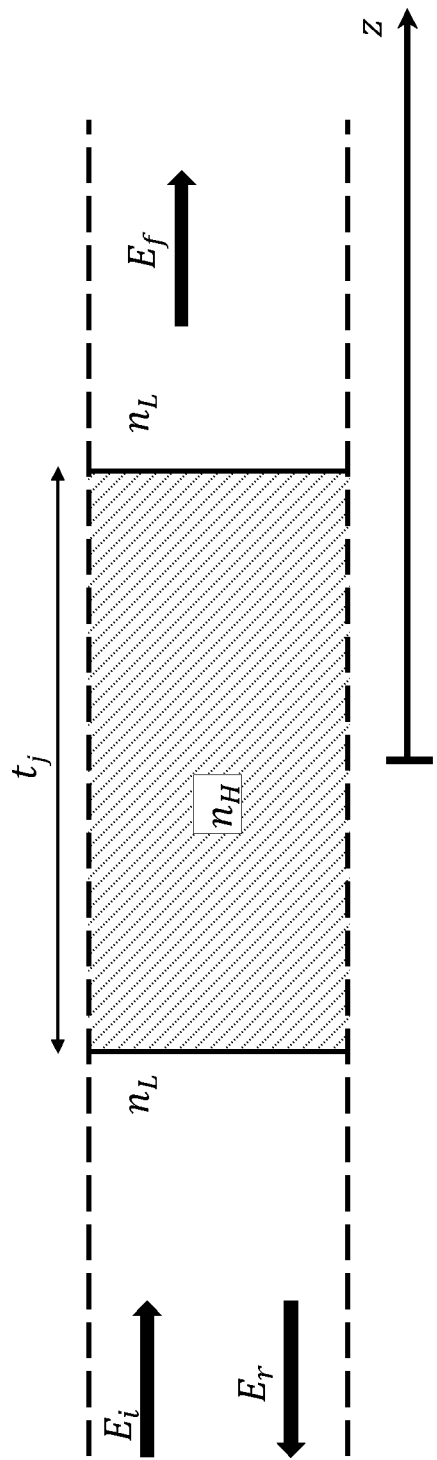
FIG. 3 is a schematic diagram depicting scattering from a single homogeneous layer of thickness t, having refractive index $n_H$ and being embedded in a host material of refractive index $n_L$, according to some embodiments of the invention. $E_i$ is the incident field which, without loss of generality, propagates to the +z direction. $E_r$ and $E_f$ are the backward-scattered and forward-scattered fields, respectively.

The final step is to determine the set of layer thicknesses $t_j$ which yield the same reflected field as would be produced by the surface currents $J_{pj}$. The scattered field as a result of a single surface current was readily given in Eq. (1). Consider a jth layer with thickness $t_j$ and refraction index $n_H$ embedded in a host medium $n_L$, as shown in FIG. 3. The forward scattered field $E_f(z)$, and the reflected scattered field $E_r(z)$ as a result of an incident plane wave $E_i(z) = E_0 e^{-jk_L z}$, can be expressed according to the transmission line theory as follows:

$$E_r(z) = E_0 \Gamma_i e^{jk_L t_j} e^{jk_L z} = E_0 P_b(t) e^{jk_L z}, z<-t_j \quad (3a)$$

$$E_f(z) = E_0\left[e^{jk_L t_j}\frac{1+\Gamma_i}{1+\Gamma_L}e^{-jk_L\left(\frac{n_H}{n_L}\right)t_j} - 1\right]e^{-jk_L z} = E_0 P_f(t) e^{-jk_L z}, z>t_j \quad (3b)$$

where $$\Gamma_L = \frac{n_H - n_L}{n_H + n_L}, \quad (4a)$$

$$\Gamma_1 = \Gamma_L e^{-jk_L\left(\frac{n_H}{n_L}\right)t_j}, \quad (4b)$$

$$Z_i = \frac{1+\Gamma_1}{1-\Gamma_L}, \quad (4c)$$

$$\Gamma_i = \frac{Z_i - \frac{n_H}{n_L}}{Z_i + \frac{n_H}{n_L}}. \quad (4d)$$

The fields inside the layer, where $|z|<t_j$, were ignored in (3) since they are not necessary for the calculation. If the incident field is propagating in the opposite direction, one should invert the roles of Eqs. (3a) and (3b).

The unique feature of the MSSM is that it provides the ability to solve each scatterer independently. Moreover, as progress with the solution is made, information on the previous layers is used to obtain the most accurate solution. Starting with unit-cell #1 (on the extreme left, assuming the incident wave propagates to the +z direction), one constructs the equation for its reflected field. On the left-hand side, is the target reflected field obtained by using its surface current $J_{p1}$ in (1). On the right-hand side the contribution of the backward scattering from the incident field must be added, as well as the forward scattering as a result of the reflected field from all the scatterers on the right which are incident on the layer. Without loss of generality, one may assume a unity amplitude incident field. The equation for the first scatterer is therefore $$\frac{J_{p1}t_c\eta}{2} = P_b(t_1) + P_f(t_1) \sum_{m=2}^{M} \frac{J_{pm}t_c\eta}{2} e^{-jk_L(m-1)t_c}. \quad (5)$$

The functions $P_b(t)$ and $P_f(t)$ are analytical, and can be calculated for different values of $t_j$. The terms in the sum and on the left hand side of the equation are known and can be calculated in an exact manner The thickness $t_1$ is chosen as the value that minimizes the magnitude of the difference of the left- and right-hand sides of Eq. (5). It should be clear that one must choose $t_1<t_c$ for practical reasons. After extracting $t_1$, one can write the equation for the second unit-cell. The left-hand side is the same as in the first unit-cell but substituting $J_{p2}$ for $J_{p1}$. In this case, the right-hand side contribution from +z propagating fields includes both the incident field, and the forward-scattered field from the first unit-cell. The equation for the second unit-cell is, therefore, $$\frac{J_{p2}t_c\eta}{2} = [P_f(t_1)e^{-jk_L t_c} + 1]P_b(t_2) + P_f(t_2)\sum_{m=3}^{M}\frac{J_{pm}t_c\eta}{2}e^{-jk_L(m-2)t_c}. \quad (6)$$

Since $t_1$ was readily calculated in the previous step, one can extract $t_2$ which minimizes the magnitude of the difference between the left- and right-hand sides. This process continues until all the thicknesses are determined. In this solution type, there is no need for matrix inversions and no iterative steps are involved. One must solve M independent equations (provided they are solved according to order), which is computationally efficient.

For demonstration, it is useful to realize two structures. One is a homogeneous material with $n_e(z)=1.62$ and thickness of T=200 nm. The second example is for $n_e(z)=1.62+0.04\cos(2\pi z/T)$ with the same thickness of T=200 nm. Both structures will be realized for λ=500 nm with $n_L=1.46$ (SiO2 and $n_H=2.03$ (Ta2O5). The Metamaterials will be composed of M=5, 8, and 12 unit-cells for comparison, i.e., $t_c$=40, 25, and 16.667 nm, respectively.

Figure 4B:
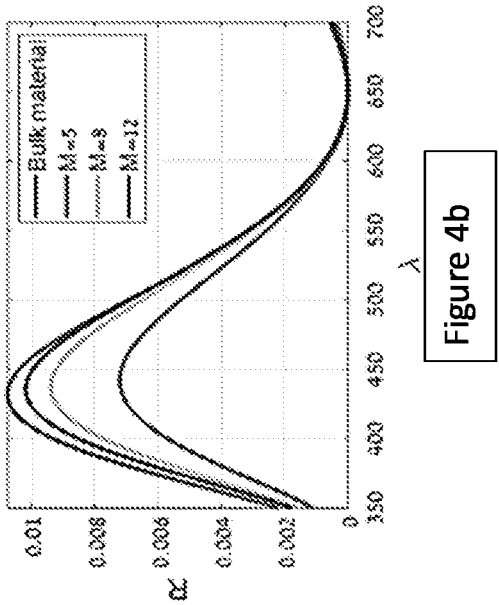
FIGS. 4(a)-(c) are plots demonstrating the MSSM on a homogeneous thin layer with thickness t=200 nm and refractive index $n_e$=1.62, which is embedded in a host material with refractive index $n_L$=1.46, according to some embodiments of the invention. The metamaterial is composed of M unit-cells in each of which a thin layer of refractive index $n_H$=2.03 is placed.
Figure 4A:
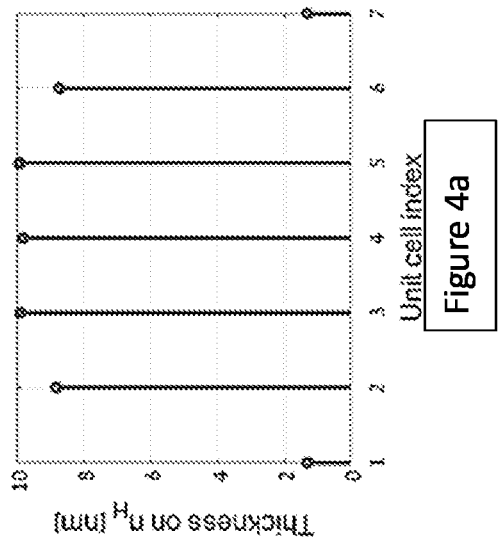
Figure 4C:
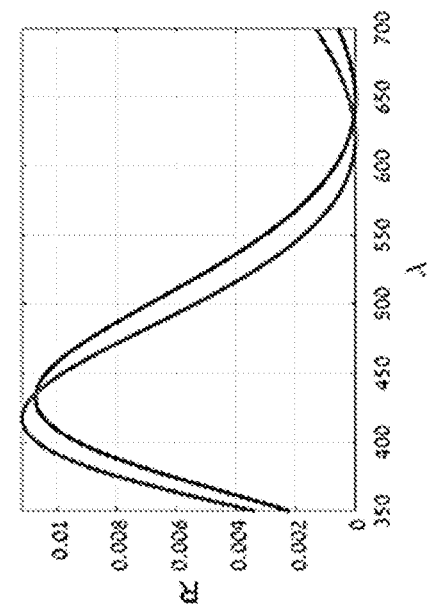

FIG. 4 shows the results for the homogeneous layer case. In FIG. 4(a) the thickness of the $n_H$ layers are shown, for M=5. Note that, as mentioned earlier, there are 7 unit-cells in the plot instead of 5. This is a result of the convolution with the filter. FIG. 4(b) shows the reflection coefficient of the structure as a function of the wavelength. According to FIG. 4(b), while the blue line represents the original material, one can realize how the implementation becomes accurate as unit-cells are added (i.e., denser sampling). The decision on the number of unit-cells is determined in accordance with the limitations on the feasible thicknesses, and the required accuracy. However, the unit-cells on the edges (which were added due to convolution) always involve very thin layers. Moreover, it turns out that once the unit-cells on the edges are removed, a good agreement between the equivalent bulk material and the synthesized material is maintained, and therefore, fewer unit-cells are required. FIG. 4(c) shows the reflection coefficient R for realization of M=4 unit-cells without the additional layers. Indeed, one can notice a slight blue shift of R, however, the thicknesses are far more feasible.

Figure 5B:
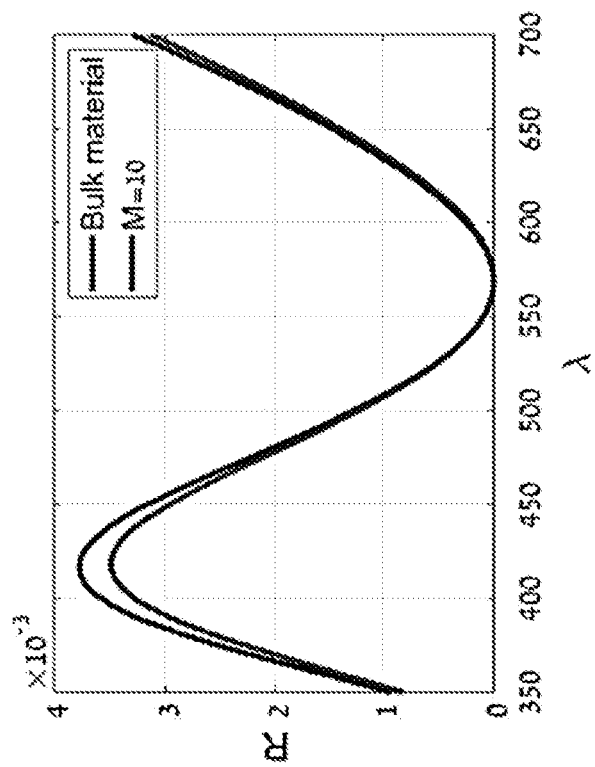
FIGS. 5(a) and 5(b) are plots relating to metamaterial synthesis of an inhomogeneous thin layer with thickness t=200 nm and refractive index $n_e$=1.62+cos(2πz/T), which is embedded in a host material of refractive index $n_L$=1.46, according to some embodiments of the invention. The metamaterial considered is composed of M=10 unit-cells in which a thin layer with refractive index $n_H$=2.03 is placed.
Figure 5A:
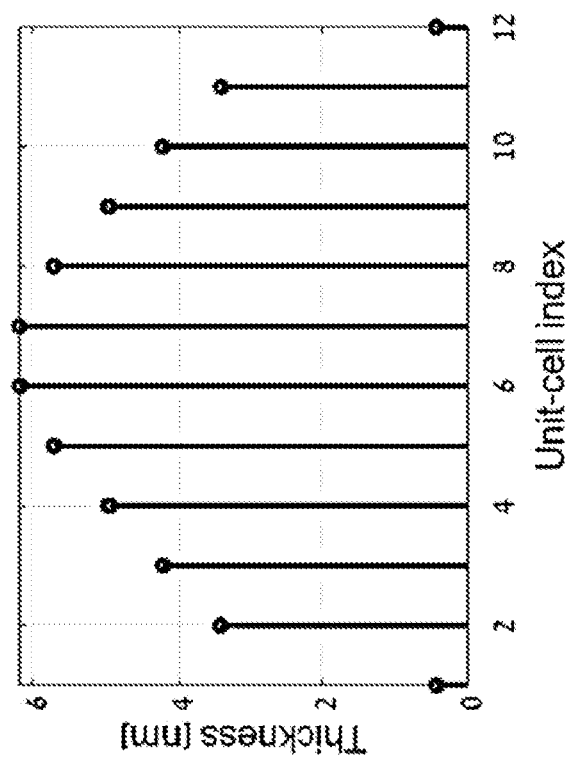

FIG. 5 shows the results for $n_e(x)=1.62+\cos(2\pi x/T)$. The thickness of the original material is T=200 nm, and the materials used for the metamaterial have a refractive index of $n_L=1.46$ and $n_H=2.03$. The metamaterial consists of M=10 unit-cells (12 after the added thickness due to convolution). FIG. 5(a) plots the thickness of high-index materials in each unit-cell. By comparing FIG. 5(a) to FIG. 4(a) one can notice the inhomogeneity of the structure. FIG. 5(b) shows the reflection coefficient R as a function of the wavelength; a good correlation can be seen between the bulk material (in blue, upper peak) and the artificial material (in red, lower peak).

Figure 6:
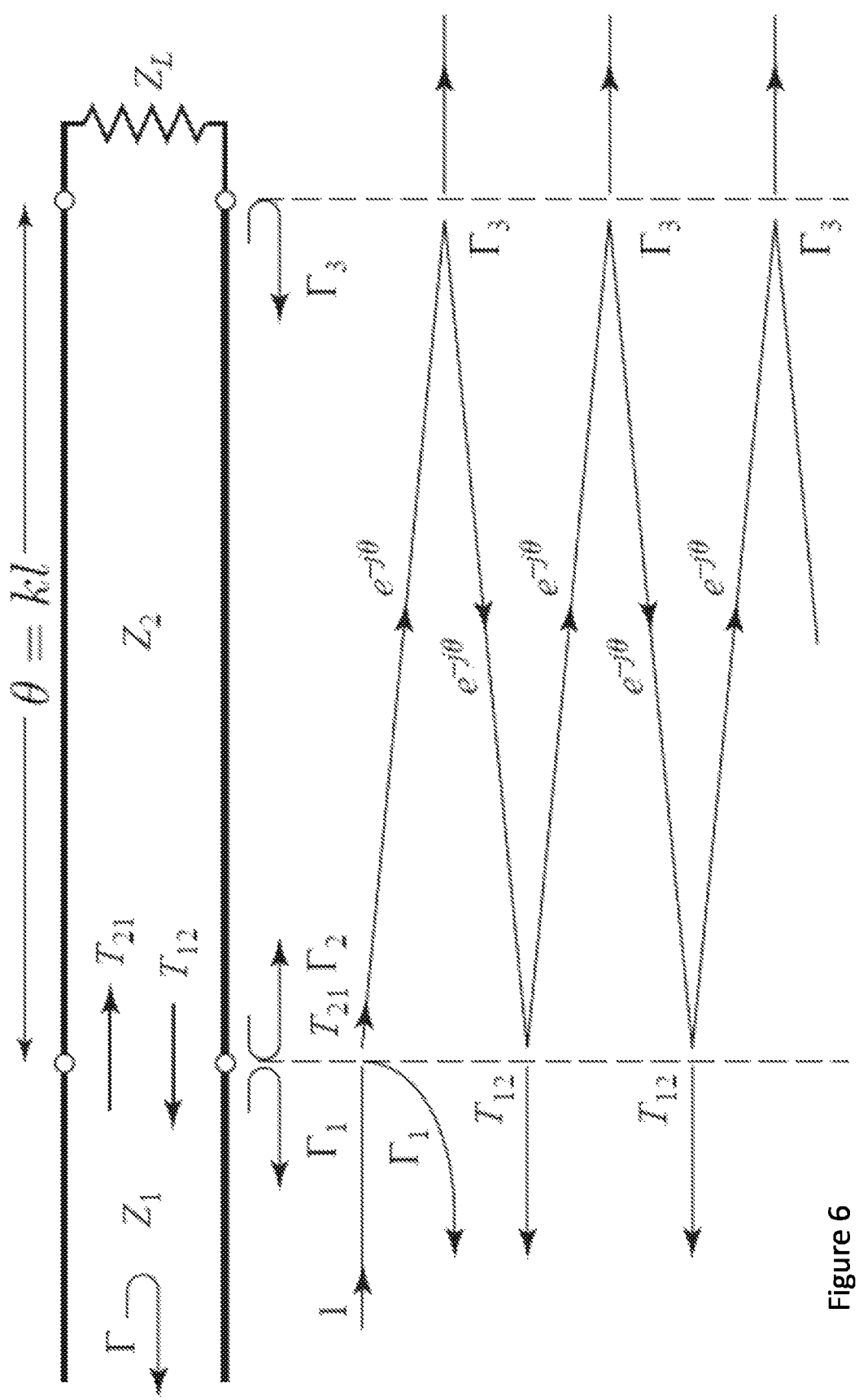
FIG. 6 is a schematic diagram illustrating bouncing for a transformer of a single layer, according to some embodiments of the invention.

The theory of small reflections is commonly used for multi-section impedance matching for antennas and RF systems. Consider the transmission line (TL) system described in FIG. 6. An incident wave propagates in TL #1, which is characterized by impedance Z1. The wave propagates into TL #2 which is characterized by impedance Z2, and is terminated by ZL. In FIG. 6, θ=kl is the optical path (electric distance), k is the wave number and l is the physical length of the TL. The reflection coefficient, accounting the multiple reflections inside TL #2, is given by $$\Gamma(\theta) = \Gamma_1 \frac{T_{12}T_{21}\Gamma_3 e^{-j2\theta}}{1 - \Gamma_2\Gamma_3 e^{-j2\theta}} \quad (7)$$

Here, $\Gamma_1$, $\Gamma_2$, T21 and T12 are the reflection and transmission coefficients in the surface between the $TL_S$, and $\Gamma_3$ is the reflection coefficient at the load (see FIG. 6), which are given by $$\Gamma_1 = \frac{Z_2 - Z_1}{Z_2 + Z_1}, \quad (8a)$$

$$\Gamma_2 = \frac{Z_1 - Z_2}{Z_2 + Z_1}, \quad (8b)$$

$$\Gamma_3 = \frac{Z_L - Z_2}{Z_L + Z_2}, \quad (8c)$$

$$T_{21} = 1 + \Gamma_1, \quad (8d)$$

$$T_{12} = 1 + \Gamma_2. \quad (8e)$$

Assuming that Z2 is close in value to Z1, and ZL is close to Z2, then the given $\Gamma_{1,2,3}$ are small. In this case, we can neglect all the quadratic terms, $\Gamma_i\Gamma_j$ in (7) to obtain the approximated formula:

$$\Gamma(\theta)=\Gamma_1+\Gamma_3 e^{-2j\theta} \quad (9)$$

Eq. (9) states that the reflection from TL #2 is dominated by the initial reflection coefficient $\Gamma_1$, and the reflection from the terminated load multiplied by a phase shift of twice the optical distance in the transformer (back and forth).

Figure 7:
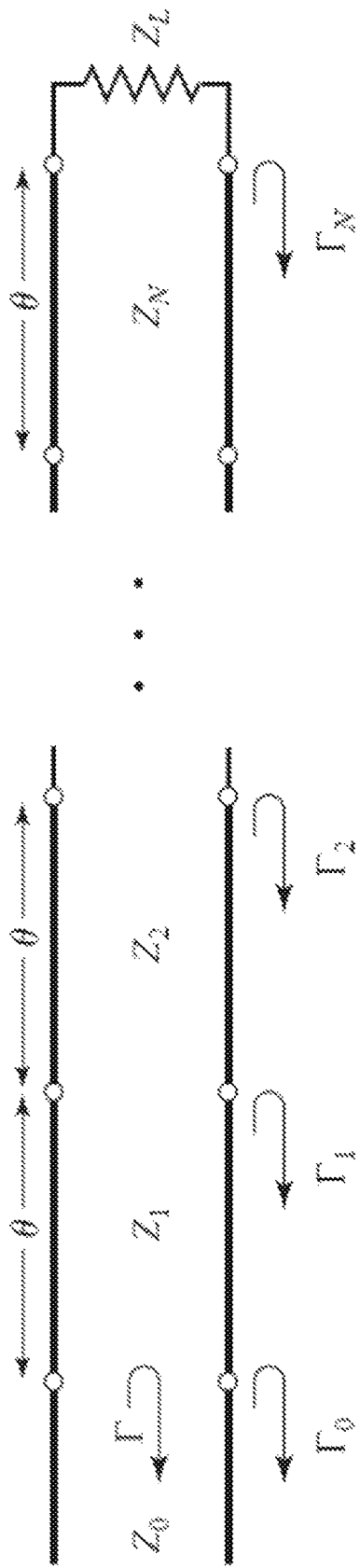
FIG. 7 is a schematic diagram illustrating a multi-section transformer on N equal-length (commensurate) sections of transmission lines, according to some embodiments of the invention.

Next, consider a multi-section transformer, constructed from N TL transformers with the same optical length θ (commensurate), as shown in FIG. 7. Using the approximated formula in Eq. (9) in a recursive manner, one obtains that:

$$\Gamma(\theta)\cong\Gamma_0+\Gamma_1 e^{-j2\theta}+\Gamma_2 e^{-j4\theta}+\ldots+\Gamma_N e^{-j2N\theta} \quad (10)$$

where, $$\Gamma_0 = \frac{Z_1 - Z_0}{Z_1 + Z_0}, \quad (11a)$$

$$\Gamma_n = \frac{Z_{n+1} - Z_n}{Z_{n+1} + Z_n}, \quad (11b)$$

$$\Gamma_L = \frac{Z_L - Z_N}{Z_L + Z_N}. \quad (11c)$$

The structure shown in FIG. 7 can be made symmetrical in the sense that $\Gamma_0=\Gamma_N$, and $\Gamma_k=\Gamma_{N-k}$. In this case, Eq. (10) can be written as a cosine series. For example, if N is even, then Eq. (10) becomes:

$$\Gamma(\theta) \cong 2e^{-jN\theta}\left[\Gamma_0 \cos(N\theta) + \Gamma_1 \cos((N-2)\theta) + \cdots + \Gamma_n \cos((N-2n)\theta) + \cdots + \frac{1}{2}\Gamma_{\frac{N}{2}}\right]. \quad (12)$$

The result for odd values of N can be rewritten in the same manner to obtain:

$$\Gamma(\theta) \cong 2e^{-jN\theta}\left[\Gamma_0 \cos(N\theta) + \Gamma_1 \cos((N-2)\theta) + \cdots + \Gamma_n \cos((N-2n)\theta) + \cdots + \Gamma_{\frac{N-1}{2}}\cos(\theta)\right]. \quad (13)$$

Similarly, the structure can be chosen to be anti-symmetric, i.e., $\Gamma_k=-\Gamma_{N-k}$ to obtain a series of sine functions instead.

The structure of the series imposes restrictions on the reflection function. For example, in order to implement Eqs. (12) and (13), three major principles must be taken into consideration: (1) since Eqs. (12) and (13) are in the form of a cosine series, the reflection $\Gamma(\theta)$ has to be an even function of the angle $\theta$. Therefore, it is sufficient to define the optical distance $\theta$ only in the region $[0,\pi]$. (2) since the series is constructed from purely even or purely odd harmonics, the reflection function $\Gamma$ has to be symmetrical with respect to $\pi/2$ in the region $[0,\pi]$ in the case where even N is used, or asymmetric if N is odd. (3) the case where $\theta=0$ corresponds to d=0. Therefore, the value at $\theta=0$ gives:

$$\Gamma(\theta = 0) = \frac{Z_L - Z_0}{Z_L + Z_0}. \quad (14)$$

The result in (14) can used to calibrate the transformer to specific host and substrate materials. In the special case where the filter is embedded in the same material, and therefore ZL=Z0, $\Gamma(\theta=0)$ has to be set to zero when the desired reflection is designed.

Figure 8:
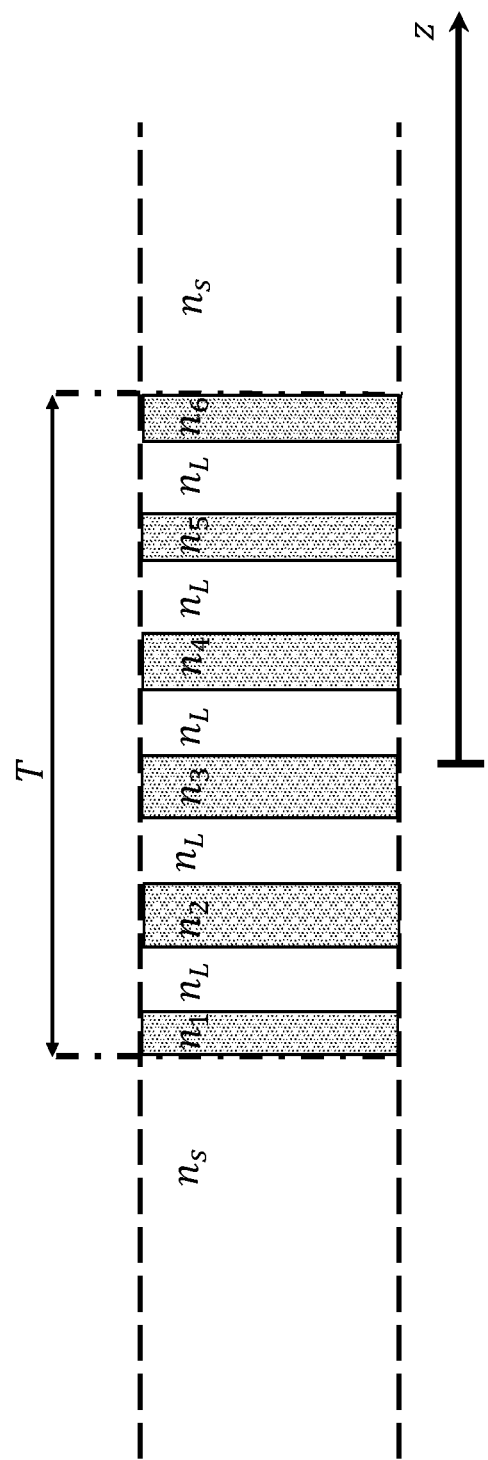
FIG. 8 is a schematic diagram depicting the filter structure, according to some embodiments of the invention, which is based on a plane stratified medium, wherein between every two layers of arbitrary refractive indexes, there is a medium with refractive index $n_L$.

The advantage of the sine or cosine shape over Eq. (10) is that the reflection function has linear phase. If this quality is not important, one can use the shape in (10) to obtain additional degrees of freedom, as no symmetry is required. However, since the coefficients $\Gamma_k$ are real valued, the reflection function will have conjugate symmetry about $\theta=0$. Also, since the the harmonics in (10) are even, the reflection function is periodic with period $\pi$. Now described is an advanced design method, which is appropriate for implementation by the MSSM. In order to demonstrate the direct design technique, a special case on NF design, located between two substrates with a refractive index of ns, is considered, however in general it can be used for other types of optical filters. The physical structure of the filter is plane stratified, in which between any two layers with arbitrary refractive index, there is a layer with a refractive index $n_L$ as shown in FIG. 8. The layers presented in FIG. 8 consist of six homogeneous inner layers of $n_e=n_1$, $n_2$ ... $n_6$ and $n_L$ in accordance with the MSSM. Consequently, the resulting coating is mostly made of a substance with refractive index $n_L$. Since the deposition rate of a lower refractive index (e.g., SiO2) is typically higher than the rate of higher refractive index materials, the above-mentioned structure is faster to fabricate then with conventional deposition techniques, and therefore, it is also more cost effective for fabrication.

The method is named "the direct method" since the reflection function is specified directly and is ideally in the $\theta$ domain, and the outcome shape of the filter is a result of the practical trade-offs taken along the design. The function is then processed to obtain the reflection coefficient defined above. The steps in the design are as follows:

1. Define the reflection function $R(\theta)=|r(\theta)|2$ where the centre of the filter is located at $\theta=\pi/2$ and its symmetry around it is maintained.
2. The reflection function is decomposed to a Fourier series according to the desired shape of the series (exponential, cosine or sine).
3. The series is truncated, and the coefficients are processed.
4. The coefficients are translated to the corresponding refractive indexes.
5. The refractive indexes are realized using the MSSM.

For demonstration, the design of a notch filter is described. The reflection function $r(\theta)$ is defined as a rectangular function centred around $\theta=\pi/2$ radians and of width W=0.3 radians (see FIG. 9 in blue). The centring around $\theta=\pi/2$ translates to alternating positive and negative Fourier series harmonics. This is the mechanism which allows one to return to $n_L$ after each layer. Since it is required that $\Gamma(0)=0$, and assuming linear phase is important, a sine series can be chosen. A sine function of even harmonics vanishes at $\theta=\pi/2$, therefore one should use a series of odd harmonics, which implies that the reflection function has to be symmetrical about $\theta=\pi/2$ (which is readily satisfied). The use of odd harmonics implies the need of an even number of reflection coefficients, and therefore, an odd number of layers. Additionally, it is possible to use a different window function (e.g., Gaussian or Hamming) instead of a rectangular window in order to suppress the side lobes.

In the second step the defined function is decomposed into Fourier sine series in the form of:

$$r(\theta) = \sum_{n=1}^{\infty} g_n \sin((2n-1)\theta). \quad (15)$$

Figure 9:
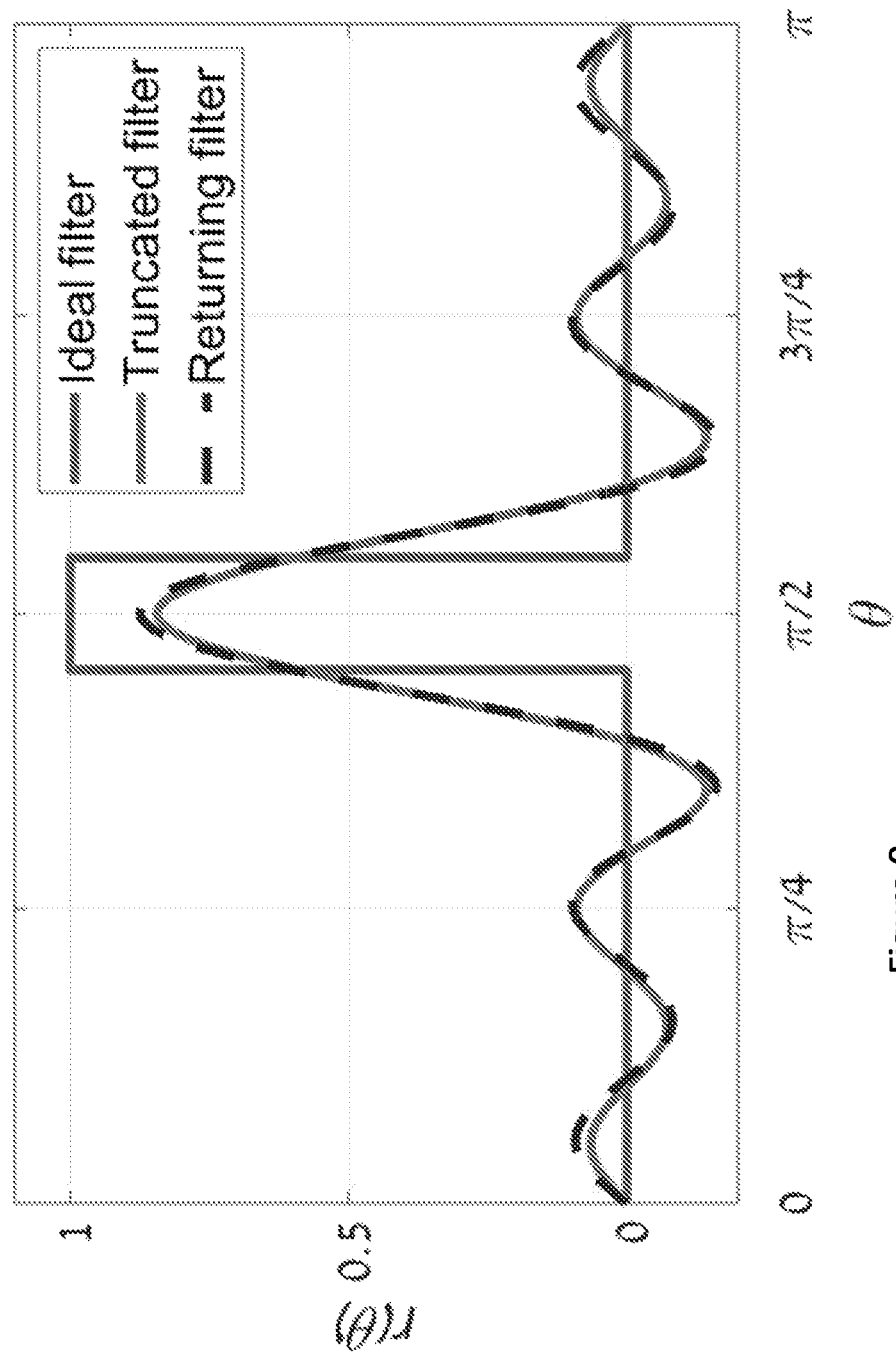
FIG. 9 is a plot depicting the design of the reflection function r(θ), according to some embodiments of the invention. The blue line (straight lines) corresponds to the direct ideal filter. The red line (solid line) corresponds to the filter structure after truncation of the first five spectral coefficients. The dashed black line corresponds to the filter structure after fixing the reflection coefficients such that there is a medium with refractive index $n_L$ between any two layers.
Figure 10:
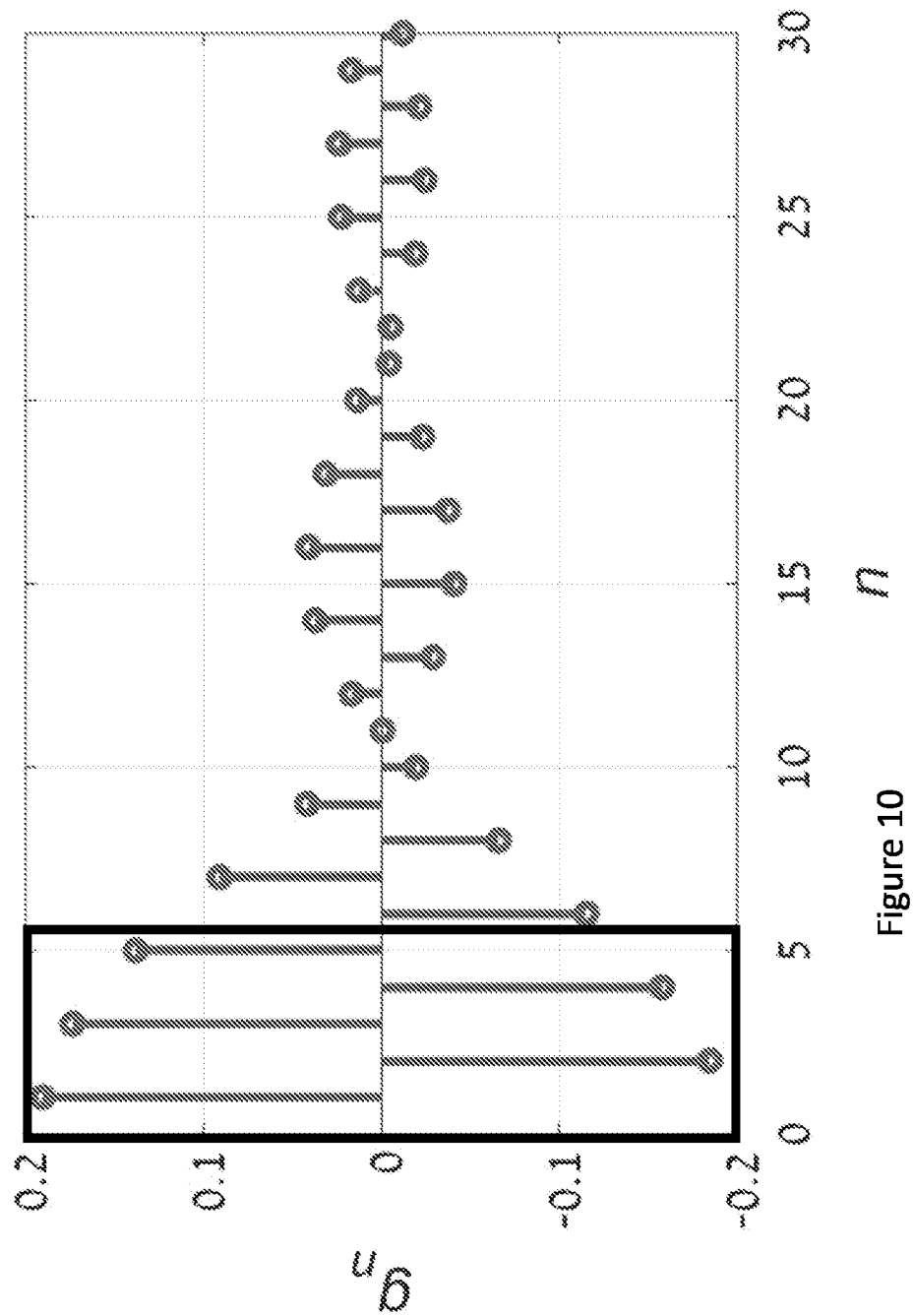
FIG. 10 is a plot depicting the sine Fourier coefficients of the direct ideal filter, according to some embodiments of the invention. The sine Fourier series is expanded for odd harmonics only. Due to symmetry, all the even Fourier coefficients vanish. The red box (from n=0 to n=5.2 and gn=−0.2 to gn=0.2), highlights the five spectral elements taken for the truncated function.

The Fourier coefficients are shown in FIG. 10. Note that the harmonics presented in FIG. 10 are alternating negative and positive, as explained above. Next, the Fourier series is truncated according to number of layers which are required. The number of layers will determine the thickness of the coating. As a rule of a thumb, each layer is a multiple of a quarter wavelength. As will be shown later, it is convenient to choose $3\lambda/4$ in order to obtain a narrow-band filter without replicas in the visible spectrum. If the average refractive index is considered to be $n_a=1.6$, then the total thickness is Th=m×$3\lambda/(4\times n_a)$, where m is the number of layers. For example, should a thickness of Th=2 µm be desired, the number of layers m required would be m=9. Therefore, one needs 10 anti-symmetric reflection coefficients, so 5 Fourier coefficients should be taken. The resulting filter consisting of only the first 5 harmonics is shown in FIG. 9 by the red line. It is important to state that the number of coefficients taken for the truncated function, directly affects the bandwidth, since a narrower spectrum results in a wider reflection function. Therefore, if one wants a narrow bandwidth, the trade-off must be more layers, and thus, a thicker coating.

According to Eq. (13) The reflection coefficient $\Gamma_0$ corresponds to the Fourier coefficient of $\cos(\theta)$, i.e., the Fourier coefficients' order is inverse to the order of the reflection coefficients. In the present case, $g_5$ corresponds to $\Gamma_0$, $g_4$ to $\Gamma_1$, and so forth. Also, in Eq. (13) it can be seen that the Fourier coefficients are twice the reflection coefficients. However, one can add a degree of freedom which enables calibration of the reflection efficiency of the realized structure. In other words, $\Gamma_{k-1}=Ag_{N/2-k}$, where $k\in[1,N/2]$, and N is the number of required reflection coefficients (assumed even for the sake of simplicity). The coefficients $\Gamma_5$ to $\Gamma_9$, are chosen to obey the anti-symmetry requirement. In addition, within the desired structure, it is a requirement that the material returns to $n_L$ for every other layer. Therefore, after arranging the reflection coefficients, one must change $\Gamma_1=-\Gamma_0$ and $\Gamma_3=-\Gamma_2$. Note that $\Gamma_6$ already equals $-\Gamma_5$ due to anti-symmetry. The resulting filter shape is shown in FIG. 9 as the dashed black line. Lastly, since it is required that the first layer be from a high index material, the first reflection coefficient $\Gamma_0$ must be negative. If this is not the case, one should negate all the coefficients.

Next, it is required to translate the reflection coefficients to the required indices. This is done using the formulae:

$$n_1 = n_s \frac{1-\Gamma_0}{1+\Gamma_0}, \quad (16a)$$

$$n_k = n_{k-1} \frac{1-\Gamma_k}{1+\Gamma_k}. \quad (16b)$$

The last step is to determine the thickness of the layers. To this end, the notch wavelength $\lambda_M$ is set, and $\theta_M$ is mapped to that point using the relation:

$$t_k = \frac{\theta_M}{2\pi} \frac{\lambda_M}{n_k}. \quad (17)$$

Figure 11:
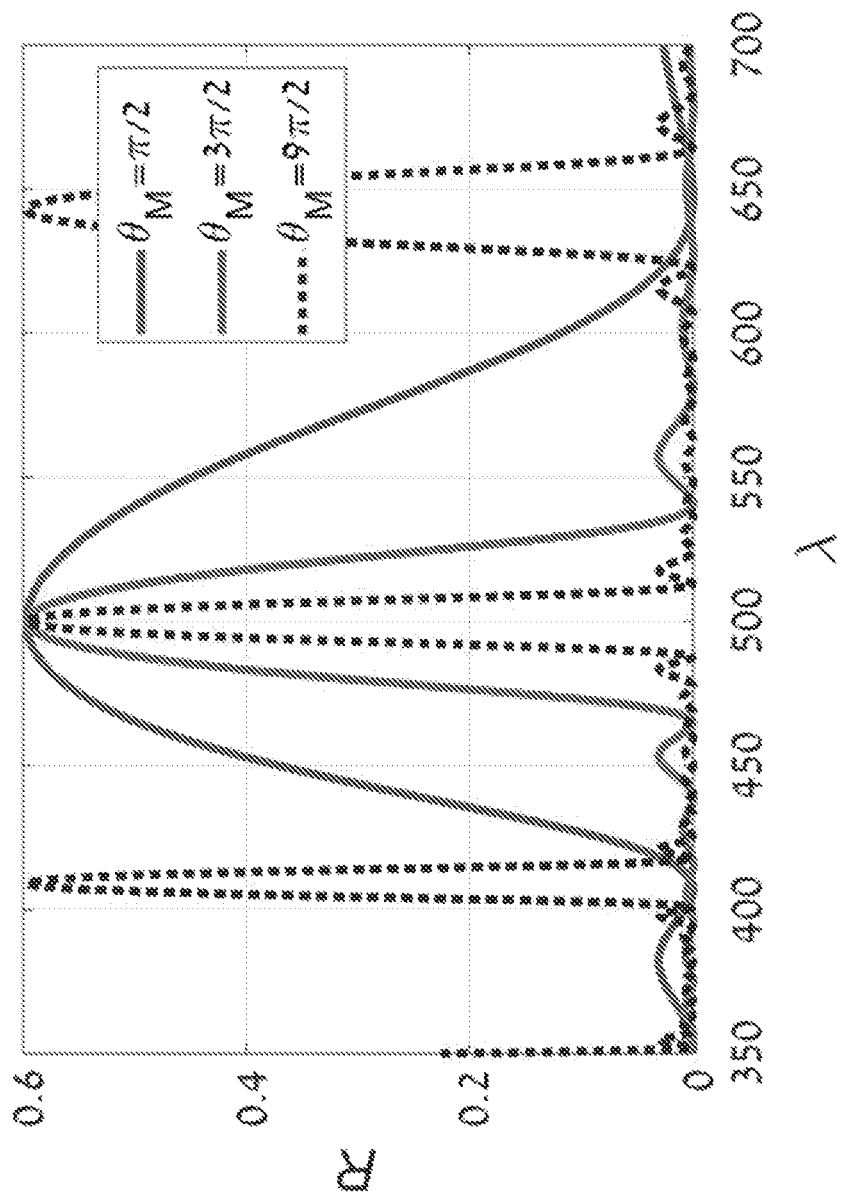
FIG. 11 is a plot depicting the energy reflection coefficient of the realized structure, according to some embodiments of the invention. The parameters for the design are $n_h$=1.5, $n_L$=1.46, $A_m$=0.6 and $\lambda_m$=500 nm. The blue line (central curve peaking between λ=400 to 630 nm roughly) corresponds to $\theta_m$=π/2, total thickness of 690 nm and FWHM of 130 nm. The red line (central curve peaking between λ=470 to 540 nm roughly) corresponds to $\theta_M$=3π/2, total thickness of 2 μm and FWHM of 43 nm. The dashed black corresponds to $\theta_M$=9π/2, total thickness of 6 μm and FWHM of 14 nm. In the last case, it is noted that other periods enter the visible spectrum.

Recall that $R(\theta)$ is periodic with period $\pi$, therefore $\theta_M$ can be chosen in more than one way. If one chooses $\theta_M=\pi/2$, then the layer thicknesses will be a quarter-wavelength (of the medium), where the angle $\theta_M=3\pi/2$ gives a thickness of three-quarters (¾) of the wavelength. Since $\theta \cong 1/\lambda$, as higher $\theta_M$ are chosen the filter becomes narrower at the expense of the overall thickness. However, at some point, the other peaks from other periods will enter the visible range. FIG. 11 shows the resulting filter for different $\theta_M$ selections. One can realize that for $\theta_M=9\pi/2$, the periods below and above enter the visible range. In this simulation, $n_s=1.5$, $n_L=1.46$, $A_m=0.6$ and $\lambda_M=500$ nm.

Specified now is the desired reflection function $\Gamma(\theta)$ according to predefined specifications; however, in this instance, $r(\theta)$ is constructed using a function which is less restrictive on the side lobes. To this end, the Chebyshev polynomials are used. The Chebyshev polynomials have a unique property: they provide controllable equal ripples at the transmitting band. This contrasts with the direct method, where an ideal filter was specified, which has zero side lobes. The extra restriction on the side lobes comes at the expense of the main lobe's width; and thus, by adding a degree of freedom (i.e., allowing a certain level of side lobes) one can optimize the band width for a required thickness.

The Chebyshev polynomials of order N, $T_N(u)$, are given by the following expression:

$$T_N(u) = \begin{cases} \cos(N \arccos(u)), & |u| < 1 \\ \cosh(N \operatorname{arccosh}(u)), & |u| > 1 \end{cases}. \quad (18)$$

Note that $T_N(u)$ is bounded in $[-1, 1]$ for $|u|<1$. This feature is responsible for the equi-ripple quality. Also, all roots of the polynomial are located in the region $[-1, 1]$ and can be derived analytically to be:

$$u_p = \cos\left(\frac{\pi(1+2p)}{2N}\right), \quad p = 0, 1, \ldots, N-1. \quad (19)$$

Figure 12:
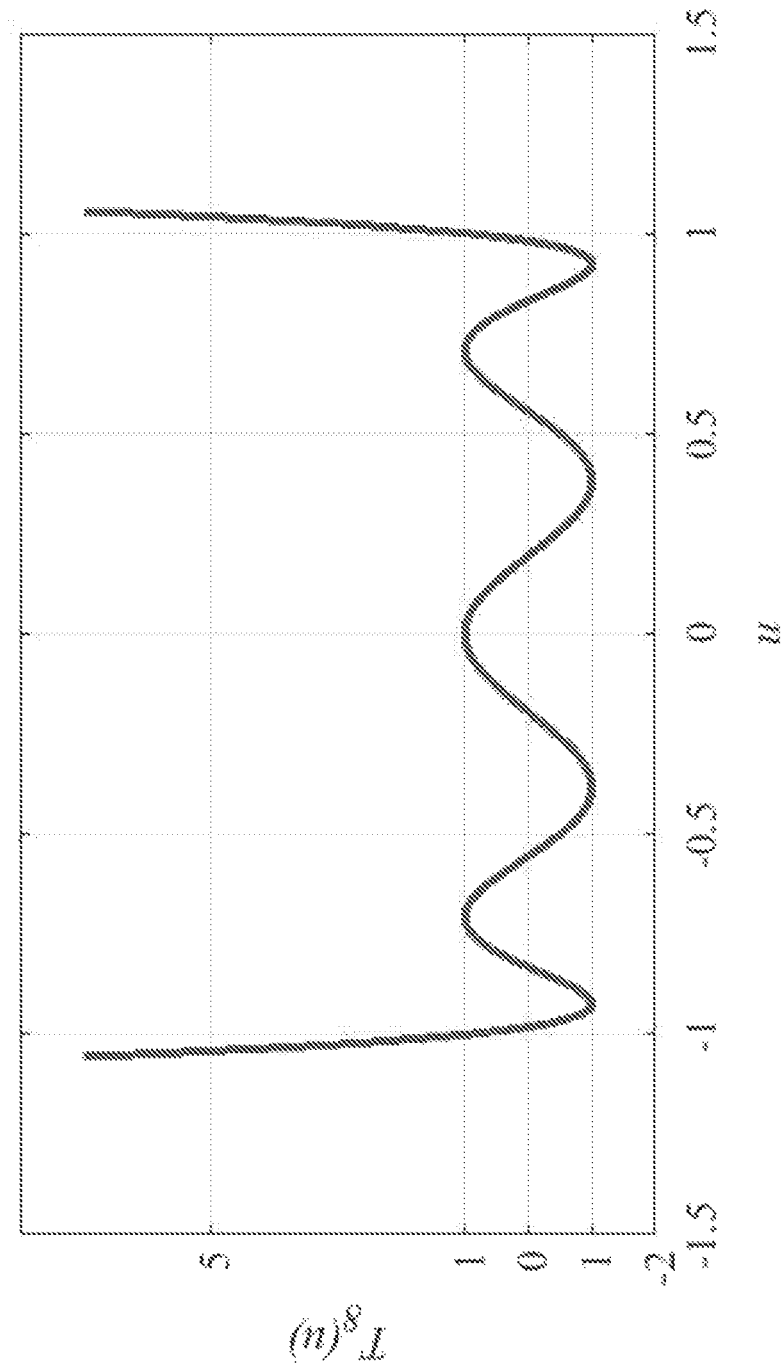
FIG. 12 is a plot depicting a Chebyshev polynomial of order 8, with the constant K=128, according to some embodiments of the invention.

The polynomial can be constructed from its roots using the term:

$$T_N(u) = K(u-u_0)(u-u_1)(u-u_2) \ldots (u-u_{N-1}), \quad (20)$$

where K is a normalization constant. FIG. 12 plots $T_8(u)$ for example. K has been set such that the ripples have a magnitude of 1. The order N affects the number of oscillations in the bounded region $u \in [-1, 1]$, and the steepness at the unbounded region.

Using the polynomial $T_N(u)$, the shape of reflection coefficient with respect to the angle $\theta$. ($\theta=kl$ is the electrical angle, or the optical length defined above) can now be designed. Design parameters $\eta_{eff}$ (the efficiency of the reflection in the notch-angle) and $\eta_{thr}$ (the maximum allowed reflection in the pass-band) are defined.

The design process is now described. According to Eq. (18), the pass-band is oscillating between 1 and −1. Thus, in order to impose the design criteria, one must set the ratio between the maximal notch's value, i.e., $\eta_{eff}$ and the maximal ripple $\eta_{thr}$ properly. Assuming that the peak of the notch is located at some $\theta=\theta_M$ then a proper mapping function from u to $\theta$ should be established. Furthermore, in order to keep the correct ratio, one should set $T_N(u_M)=\eta_{eff}/\eta_{thr}$. Using Eq. (18) one obtains that:

$$u_M = \cosh\left(\frac{\operatorname{arccosh}(\eta_{eff}/\eta_{thr})}{N}\right). \quad (21)$$

In order to map $u_M$ to $\theta=\theta_M$, one can use the mapping function $$u=u_M \cos(\theta-\theta_M) \quad (22)$$

Figure 13:
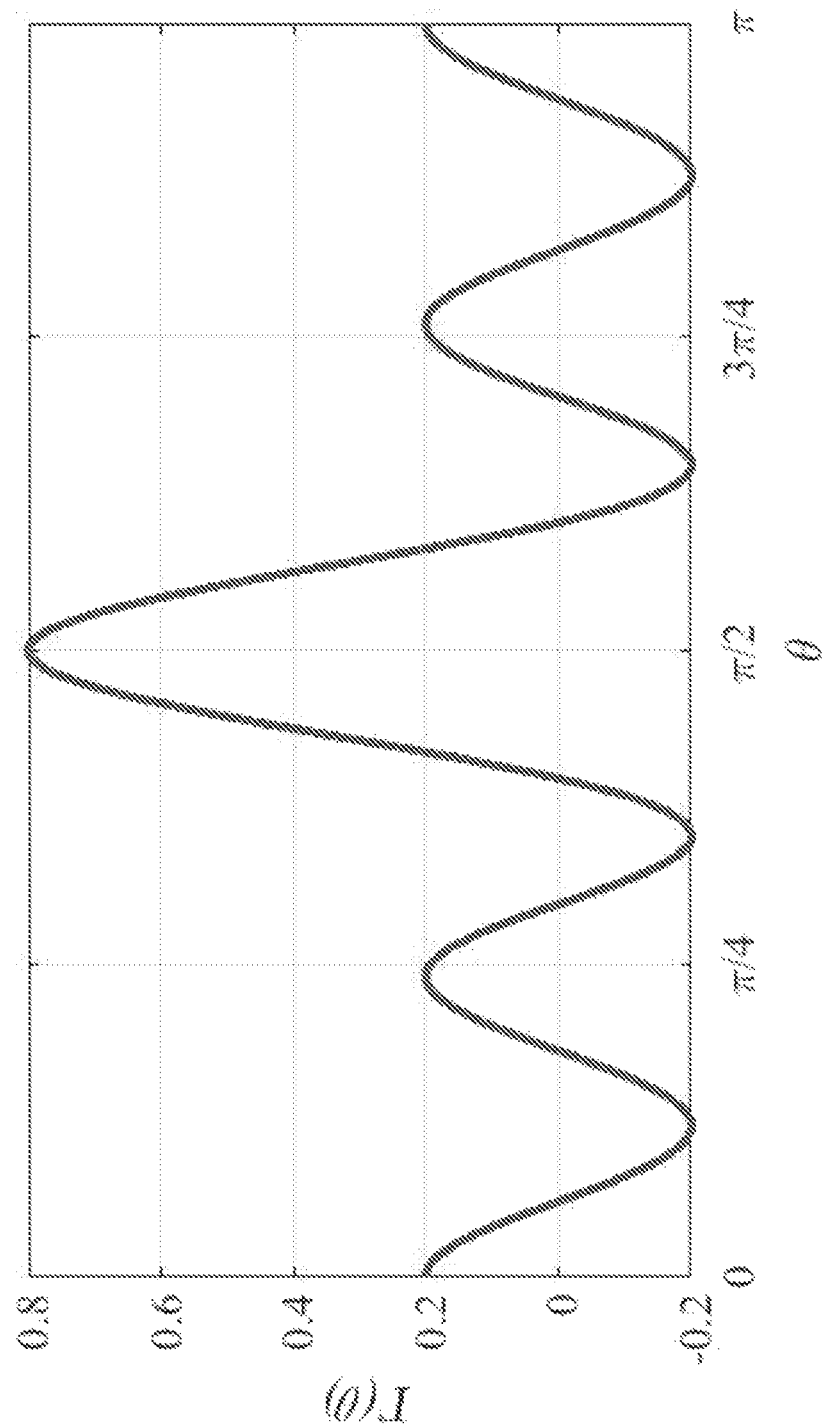
FIG. 13 is a plot depicting the reflection function based on the Chebyshev polynomial of order N=8. The design criteria are $\eta_{eff}$=0.8 and $\eta_{thr}$=0.2, according to some embodiments of the invention.

The constant K is chosen such that it sets the proper maximum value, i.e., $K=\eta_{eff}/\Gamma_{max}$. The resulting reflection function $\Gamma(\theta)$ is shown in FIG. 13, where $\theta_M=\pi/2$, $\eta_{eff}=0.8$, $\eta_{thr}=0.2$ and N=8.

The design of the polynomial should satisfy some practical conditions, which have already been described above. For one, $u_m$ should be mapped to $\theta_M=\pi/2$ since one wants the Fourier-series harmonics to have alternating positive and negative terms. Also, since the polynomial is symmetrical around $\pi/2$, this dictates the use of even or odd harmonics, depending on if one chooses sine or cosine series. In addition, $\Gamma(0)$ should be equal to the reflection coefficient without the coating. Therefore, if the host and substrate materials are the same, one has $\Gamma(0)=0$ and it would be more appropriate to use a sine series. Also, if the polynomial has an odd order N, it will vanish naturally at $\theta=0$. Otherwise, one must make use of a cosine series.

Figure 14A:
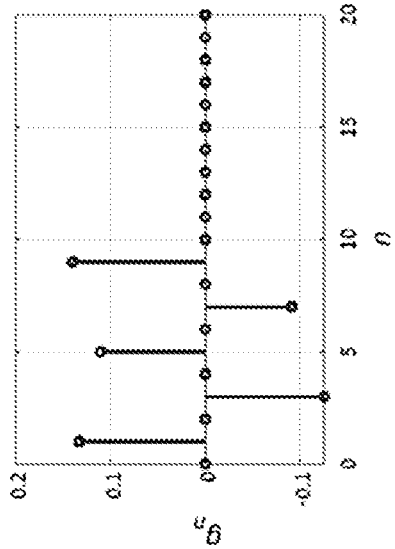
FIGS. 14(a)-(c) are plots depicting a Chebyshev based filter design, according to some embodiments of the invention.
Figure 14B:
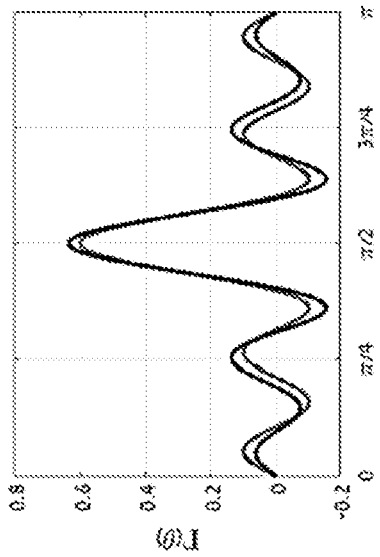
Figure 14C:
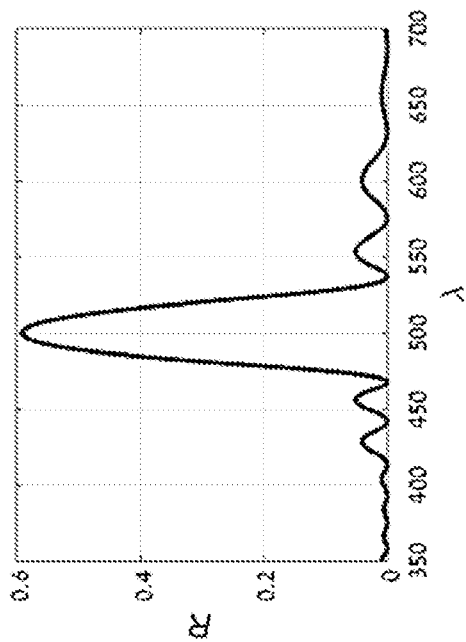

The next step is to decompose the polynomial as a Fourier series. From this step, the design is entirely identical to the direct method described above. In order to demonstrate the use of the Chebyshev method, the design of a notch filter based on 9 layers is considered, in order to compare the results to the direct method. To this end, having derived an N=9 Chebyshev polynomial, with $\eta_{eff}=0.6$, and $\eta_{thr}=0.1$ the polynomial and its sine Fourier coefficients are presented in FIGS. 14(*a*) and 14(*b*). Note, that the spectrum of the Chebyshev polynomial consists of five spectral elements exactly. Consequently, there is no need to truncate the series. Thus, all the deviations from the original design are caused by fixing the coefficients. The resulting reflection functions of the series (original design) and fixed functions are shown in FIG. 14(*a*) in red and black lines, respectively. The coefficients are then translated to refractive indices to achieve the function $R(\lambda)$ shown in FIG. 14(*c*) by the solid black line. The resulting overall thickness is 2 μm, and the FWHM is 39 nm, with comparison to 43 nm for the direct method, shown in FIG. 14(*c*) in the dashed blue line.

Described now are ultra-thin notch filters. Typical notch filters have film thicknesses of a few microns. In cases where the filter is deposited on a surface using a mask, the resulting step will be visible due to stray light scattered from the edges. In order to eliminate the geometric step transition, the step needs to be sub-micron in thickness, and smoothed. Considered below is a method of depositing filters such that the resulting step size is reduced. While the method can be applied to other filter designs, the greatest benefit is seen in applying it to the design techniques presented above. A filter produced using such a method will have a step size of approximately 15% of the total thickness of the filter. In addition, the edges are smoother in comparison to standard deposition techniques.

The main principle of the method is to use a mask only for the deposition of the high-index material, in this example. Of course, if fabricating a low index material embedded in a high-index material a mask will be used for the deposition of the low-index material. If more than two materials of different refractive index are used, for example, three or four or more, materials, masks may be used such that the desired structure is fabricated.

FIG. 15 illustrates a four-layer filter deposited with the aforementioned method. In this figure, the first layer deposited on the substrate is a high-index material (represented by the black area in FIG. 15(a)), and a mask was used. The use of the mask enables a clean layer with defined edges to be deposited. The next layer is a low-index material (represented by the diagonally-lined area in FIG. 15(b)) which was deposited over the entire surface. If the refractive index of the low index material is close to that of the substrate, then no optical artefacts are expected outside the filter region. Due to the step coverage, the transition area is smoothed (see FIG. 15(b)). The next high-index material layer is again deposited through a mask, as shown in FIG. 15(c). The result of this process is that the area which was not intended to be coated will receive a layer of low-index material which does not affect its transparency. The thickness of this layer is the sum of all the thicknesses of the low-index materials in the coating (see in FIG. 15(d)). Therefore, the step size is the sum of the thicknesses of all the high-index materials. The coating is embedded in the surface. Using the techniques of MSSM, a filter can be produced such that the high-index material comprises only 15% of the total coating thickness. Thus, a 2 μm coating would result in a 300 nm step size. A step of such magnitude will not be noticeable if placed at a reasonable distance from the eye.

For the special example of a notch filter based on eleven (11) alternating layers of SiO2 (the lower refractive index) of thickness 257 nm and a material of higher refractive index $n_e$=1.67 of thickness 174 nm a design for a meta-notch filter using a metamaterial based on Ta2O5 with expected refractive index of $n_H$=2.03 (higher refractive index) embedded in a SiO2 environment of lower refractive index $n_L$=1.46 is presented in table 1. The filter is implemented by employing the MSSM technique based on the layer structure presented in the table, with layer thicknesses also tabulated.

TABLE 1

The metamaterial design based on MSSM. Note the sum of the thicknesses is 174 nm. Each twelve-layer block of metamaterial comprises one layer of the overall eleven-layer notch filter.

| Unit-cell number | Layer number | Material | Thickness [nm] |
|---|---|---|---|
| 1 | 1 | SiO2 | 15 |
|   | 2 | Ta2O5 | 13 |
|   | 3 | SiO2 | 15 |

TABLE 1-continued

The metamaterial design based on MSSM. Note the sum of the thicknesses is 174 nm. Each twelve-layer block of metamaterial comprises one layer of the overall eleven-layer notch filter.

| Unit-cell number | Layer number | Material | Thickness [nm] |
|---|---|---|---|
| 2 | 4 | SiO2 | 15 |
|   | 5 | Ta2O5 | 14 |
|   | 6 | SiO2 | 15 |
| 3 | 7 | SiO2 | 15 |
|   | 8 | Ta2O5 | 14 |
|   | 9 | SiO2 | 15 |
| 4 | 10 | SiO2 | 15 |
|   | 11 | Ta2O5 | 13 |
|   | 12 | SiO2 | 15 |

Figure 16:
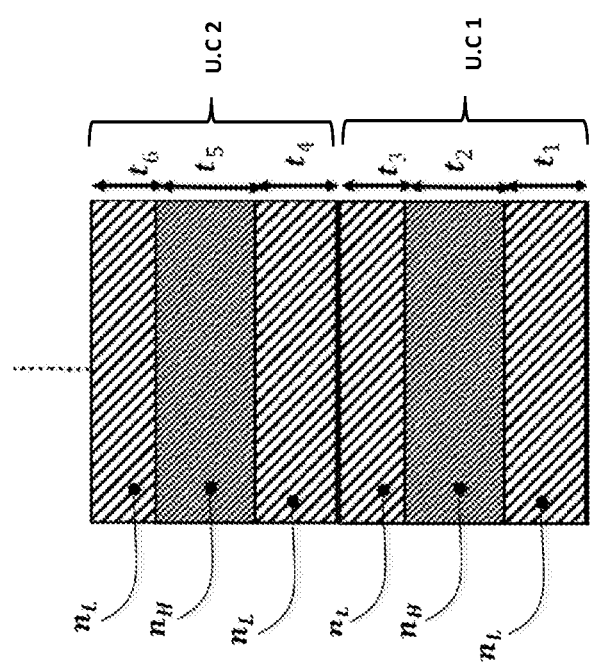
FIG. 16 is a schematic diagram of the arrangement of the thin layers in a meta-notch filter, with indication of the first two unit-cells, according to some embodiments of the invention.

FIG. 16 illustrates the layer structure on which the unit-cells are based. In this figure the first two unit-cells (termed U.C 1 and U.C 2) are presented. The thickness of each layer is labelled by $t_1, t_2, \ldots$ It is important to note that whenever we have adjacent layers of the same material, they are deposited in a single process. For example, layers (3,4), (6,7) and (9,10) in table 1 are deposited as single layers of 30, 29 and 30 nm, respectively and such single process deposition also occurs for start and end layers of the metamaterial blocks in instances where the previous layer of the overall eleven-layer notch-filter design is comprised of the same material (e.g. layers 1 and 12 of the second metamaterial block (i.e. the third layer in the eleven-layer notch filter) are both layers of SiO2 which contact another layer of SiO2 (namely layers 2 and 4 of the eleven-layer notch filter).

The entire filter is meant to be placed between two microscope slides (soda lime glass with refractive index $n_s$=1.5). Because the refractive index of SiO2 is very close to that of the glass slides, the first and the last layers may be discarded. Overall, seven layers are deposited for each metamaterial, and six layers of the metamaterial itself are deposited. This equates to forty-two layers, and taking into account the remaining five layers of SiO2 being deposited this brings the total to forty-seven layers.

In this case the overall thickness is 2300 nm, the maximal reflection efficiency is 45% for a wavelength of 500 nm, and the full-width-half-maximum (FWHM) is 30 nm. The deposition was performed using ion-beam sputtering.

Figure 17:
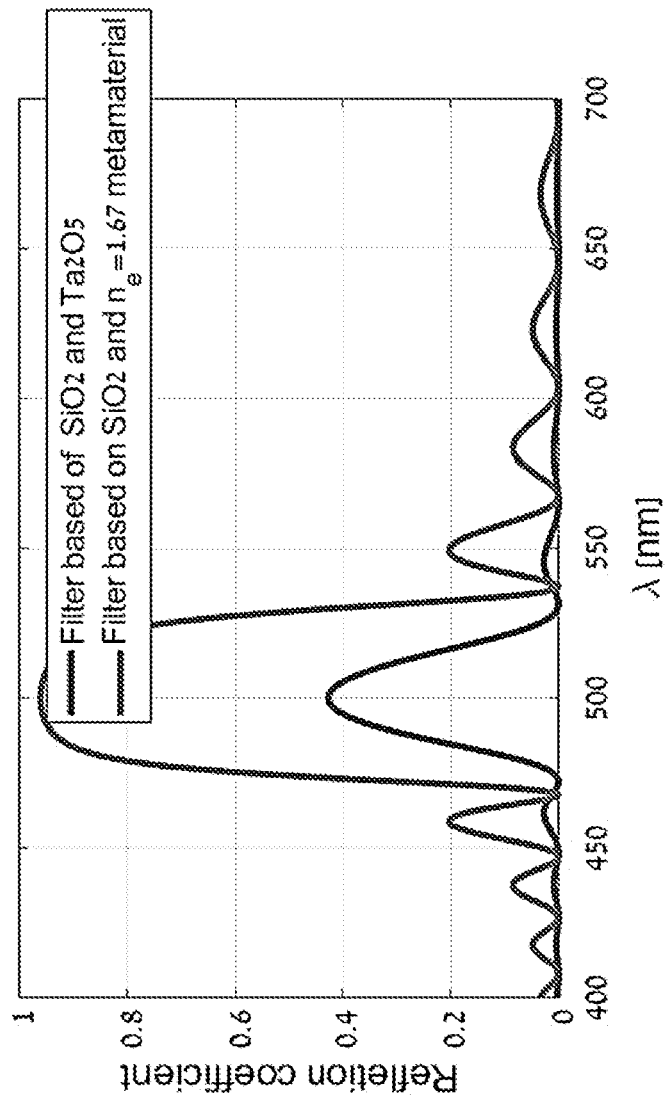
FIG. 17 is a plot, according to some embodiments of the invention) comparing a metamaterial-based filter design (blue, lower curve) and a filter with the same number of layers comprised of Ta2O5 in place of the metamaterial (upper curve)

FIG. 17 shows a comparison of the metamaterial-based filter and a filter with the same number of layers if alternating layers of SiO2 and Ta2O5 are used. According to FIG. 17 one can note that a filter based on alternating layers of off-the-shelf materials (SiO2 and Ta2O5) is much stronger in reflection and broader band width than the MSSM based design.

Figure 18:
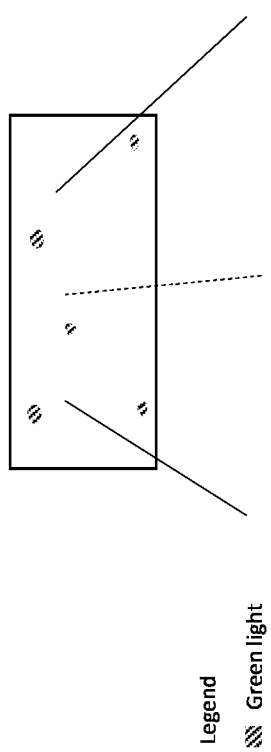
FIG. 18 is a photograph demonstrating a significant green reflection for an MSSM based meta-notch filter positioned in ambient light, according to some embodiments of the invention.

The filter presented in FIG. 18 was fabricated according to the alternating layer structure of high and low refractive index materials using an Intivac machine. In this picture, one observes that a significant green reflection is given, whilst the scenery transferred through the filter remains unbiased with minimal green tint.

In a second example of MSSM design, a partially reflecting filter having a flat reflection as a function of wavelength is designed (also known as a beam splitter).

The main feature of the filter is to provide the ability to achieve 16% uniform reflectivity in the visible range by depositing nine layers, where a reduced uniform reflectivity of 8% can be given by the first three layers. By doing so, the reflectivity can be reduced by half in one part (adding a mechanical mask) where locations that are not obscured and are coated with six more layers will be twice as strong. This special filter is termed the 50/50 filter and is employed in multi-layered-thin-combiners. This filter was also deposited by ion-beam sputtering processes.

The design is given as follows. First the initial three layers are deposited using the following table (table 2):

TABLE 2

First three layers of the 50/50 filter

| Layer number | Material | Refractive index | Thickness (nm) |
|---|---|---|---|
| 1 | Al2O3 | $n_1 = 1.68$ | 74 |
| 2 | Ta2O5 | $n_2 = 2.15$ | 57 |
| 3 | SiO2 | $n_3 = 1.48$ | 84 |

After depositing these three layers, a mask is applied to the areas on which only an 8% reflection is desired. Next, layers 4-9 are deposited in accordance with table 3:

TABLE 3

The entire structure of the 50/50 filter.

| Layer number | Material | Refractive index | Thickness (nm) |
|---|---|---|---|
| 1 | Al2O3 | $n_1 = 1.68$ | 74 |
| 2 | Ta2O5 | $n_2 = 2.15$ | 57 |
| 3 | SiO2 | $n_3 = 1.48$ | 84 |
| 4 | Ta2O5 | $n_2 = 2.15$ | 8 |
| 5 | Al2O3 | $n_1 = 1.68$ | 13 |
| 6 | Ta2O5 | $n_2 = 2.15$ | 9 |
| 7 | Al2O3 | $n_1 = 1.68$ | 13 |
| 8 | Ta2O5 | $n_2 = 2.15$ | 8 |
| 9 | Al2O3 | $n_1 = 1.68$ | 74 |

In table 3, layers 4-8 represent a metamaterial with a homogeneous refractive index $n_e=1.9$. This layer enables calibration of the difference in reflectance.

Figure 19:
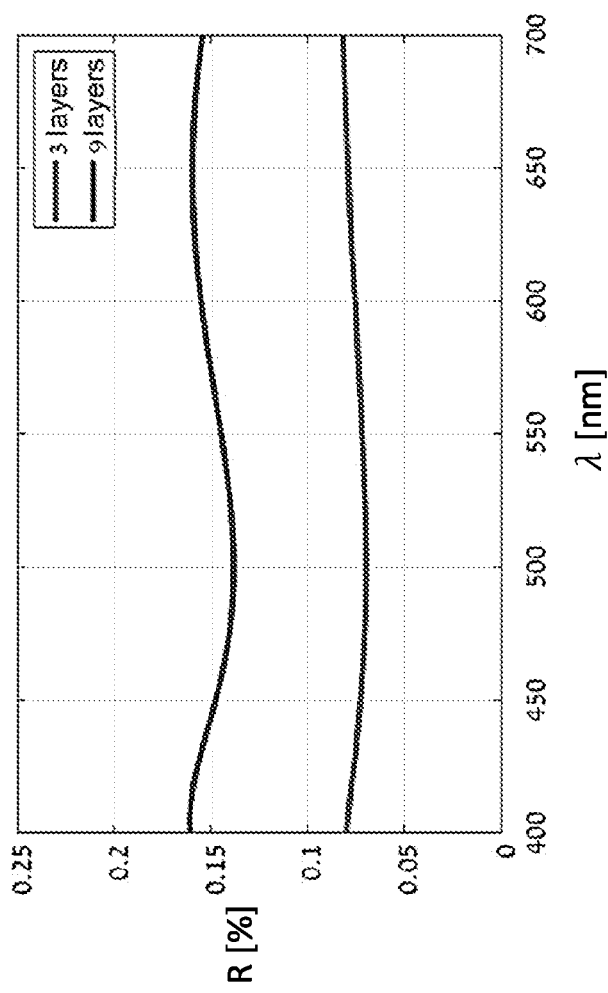
FIG. 19 is a plot of the reflectivity versus the wavelength to describe reflectance of a 50/50 filter, according to embodiments of the present invention. The reflectance as a result of the first three layers is shown in red (lower line) and the reflectance as a result of the entire structure is shown in blue (upper curve)
Figure 20:
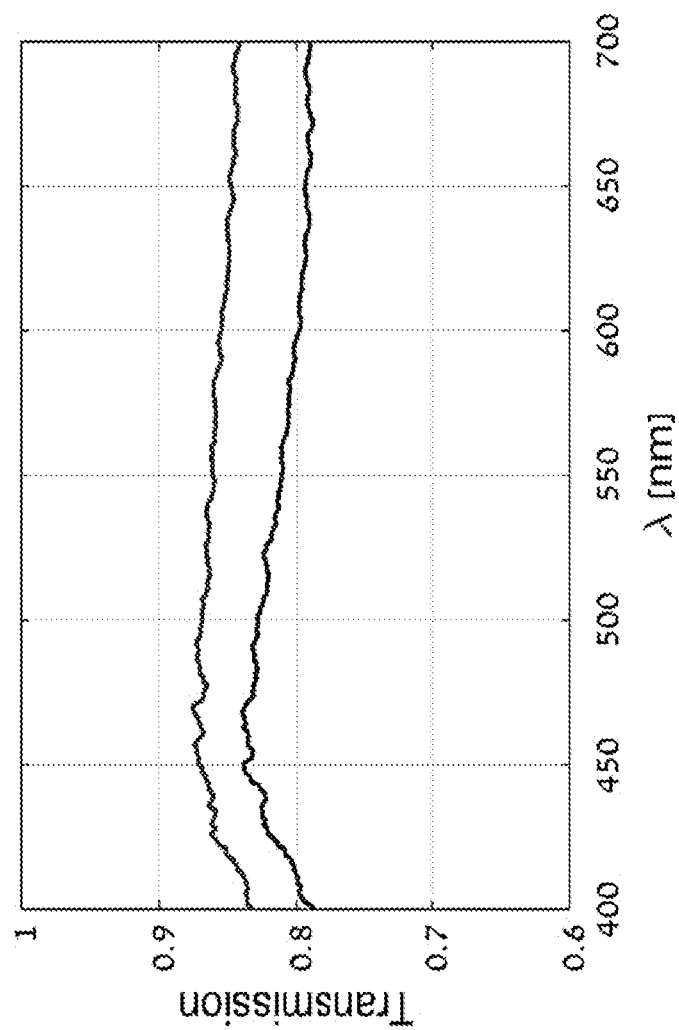
FIG. 20 is a plot presenting a reflectometer measurement of the 50/50 filter, according to embodiments of the present invention. The blue line (lower curve) represents the transmission of the nine-layer filter. The red line (upper curve) represents the transmission of the three-layer filter.

FIG. 19 shows the simulated reflectance of the filter with three layers (in red) and with the complete structure (blue). FIG. 20 shows the transmission of the fabricated filter measured with a reflectometer. The blue line represents a three-layer filter, and the red line represents the full nine-layer filter. The difference between the lines is approximately 6%.

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A method of synthesizing an effective refractive index metamaterial, said method comprising the steps of:
   a) analysing an effective index material by directing an electromagnetic plane-wave towards a surface of said metamaterial and calculating the polarization currents distribution field in said metamaterial, wherein said effective refractive index metamaterial is comprised of a plurality of layers of at least a first material having a first refractive index and at least a second material having a second refractive index;

b) filtering and sampling said polarization currents distribution field according to said layers, wherein said layers comprise pre-determined parameters requirements, said parameters including at least one of: refractive indexes of said first material and said second material, effective refractive index of said layer and thickness of said layer; and c) determining a layer arrangement and thickness for said first and second materials comprising said plurality of layers, such that said polarization currents distribution field in said metamaterial imitates the current distribution field generated by surface currents corresponding to said sampled polarization currents distribution field.

2. The method according to claim 1, wherein step a) comprises:

emulating an effective refractive index layer with a homogeneous refractive index by solving a resulting relationship using an analytical method.

3. The method according to claim 1, wherein step a) comprises:

emulating an effective layer with a varying refractive index by solving a resulting relationship using a numerical method.

4. The method according to claim 1, wherein step b) comprises:

calculating the reflected field as a result of the polarization current distribution field;

calculating the scattered field as a result of said surface currents; and convolving along the structural cross-section of the effective refractive index layer to obtain the total reflected field.

5. The method according to claim 1, wherein step c) comprises:

determining a layer thickness of each said layer which yields the same reflected surface current field as that produced by said sampled surface currents field.

6. The method according to claim 1, wherein said effective refractive index layer comprises a plurality of unit-cells, wherein said unit-cell comprises at least a first material and a second material, said first material being of a different refractive index than said second material.

7. The method according to claim 6, wherein said unit-cell is embedded in a third material, wherein said third material has the same refractive index as said first material. or said second material.

8. The method according to claim 6, wherein said unit-cell is embedded in a third material, wherein said third material has the same refractive index as second material.

9. The method according to claim 6, wherein said unit-cell comprises a layer of said first material sandwiched between two layers of said second material and wherein each layer of said first material and said second material are of a pre-determined thickness in a direction orthogonal to a surface of said metamaterial.

10. The method according to claim 6, wherein said first material is of a low refractive index and said second material is of a high refractive index.

* * * * *